United States Patent
Wang et al.

(10) Patent No.: US 11,704,817 B2
(45) Date of Patent: Jul. 18, 2023

(54) METHOD, APPARATUS, TERMINAL, AND STORAGE MEDIUM FOR TRAINING MODEL

(71) Applicant: Tencent Technology (Shenzhen) Company Limited, Shenzhen (CN)

(72) Inventors: Ning Wang, Shenzhen (CN); Yibing Song, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 251 days.

(21) Appl. No.: 17/369,833

(22) Filed: Jul. 7, 2021

(65) Prior Publication Data

US 2021/0335002 A1    Oct. 28, 2021

Related U.S. Application Data

(63) Continuation of application No. PCT/CN2020/083523, filed on Apr. 7, 2020.

(30) Foreign Application Priority Data

May 13, 2019 (CN) .......................... 201910397253.X

(51) Int. Cl.
*G06T 7/20*        (2017.01)
*G06T 7/246*      (2017.01)
(Continued)

(52) U.S. Cl.
CPC ............ *G06T 7/246* (2017.01); *G06F 18/214* (2023.01); *G06F 18/253* (2023.01); *G06T 7/73* (2017.01);
(Continued)

(58) Field of Classification Search
CPC . G06T 7/246; G06T 7/73; G06T 2207/20081; G06T 2207/20084;
(Continued)

(56) References Cited

U.S. PATENT DOCUMENTS

| | | | |
|---|---|---|---|
| 2019/0021426 A1 | 1/2019 | Barnes et al. | |
| 2020/0134800 A1* | 4/2020 | Hu | ........................ G06V 10/25 |

FOREIGN PATENT DOCUMENTS

| | | |
|---|---|---|
| CN | 103149939 A | 6/2013 |
| CN | 109215057 A | 1/2019 |

(Continued)

OTHER PUBLICATIONS

Zuehlke et al., "Machine learning using template matching applied to object tracking in video data", Proceedings of SPIE (Year: 2019).*

(Continued)

*Primary Examiner* — Qian Yang
(74) *Attorney, Agent, or Firm* — Morgan, Lewis & Bockius LLP

(57) ABSTRACT

This application disclose a method for training a model performed at a computing device. The method includes: acquiring a template image and a test image; invoking a first object recognition model to process a feature of a tracked object in the template image to obtain a first reference response, and a second object recognition model to process the feature in the template image to obtain a second reference response; invoking the first model to process a feature of a tracked object in the test image to obtain a first test response, and the second model to process the feature to obtain a second test response; tracking the first test response to obtain a tracking response of the tracked object; and updating the first object recognition model based on differences between the first and second reference responses, that (Continued)

between the first and second test responses, and that between a tracking label and the tracking response.

20 Claims, 9 Drawing Sheets

(51) Int. Cl.
    *G06T 7/73* (2017.01)
    *G06V 20/64* (2022.01)
    *G06F 18/214* (2023.01)
    *G06F 18/25* (2023.01)
    *G06V 10/75* (2022.01)
    *G06V 10/82* (2022.01)
    *G06V 10/44* (2022.01)
    *G06V 10/62* (2022.01)

(52) U.S. Cl.
    CPC ............ *G06V 10/454* (2022.01); *G06V 10/62* (2022.01); *G06V 10/75* (2022.01); *G06V 10/82* (2022.01); *G06V 20/64* (2022.01); *G06T 2207/20081* (2013.01)

(58) Field of Classification Search
    CPC . G06T 2207/30196; G06T 2207/30241; G06F 18/214; G06F 18/253; G06V 10/454; G06V 10/62; G06V 10/75; G06V 10/82; G06V 20/64; G06V 20/46; G06V 20/48
    See application file for complete search history.

(56) References Cited

FOREIGN PATENT DOCUMENTS

| | | | |
|---|---|---|---|
| CN | 109344742 A | | 2/2019 |
| CN | 109671102 | * | 4/2019 |
| CN | 109766954 A | | 5/2019 |
| CN | 110147836 A | | 8/2019 |
| JP | 2018139103 A | | 9/2018 |

OTHER PUBLICATIONS

Yang et al., "Learning Dynamic Memory Networks for Object Tracking", ECCV 2018 paper (Year: 2018).*
Chantara, et al., "ObjectTracking using Adaptive Template Matching", IEIE Transactions on Smart Processing and Computing, vol. 4, No. 1, Feb. 2015 (Year: 2015).*
Machine translation for CN 109671102 (Year: 2019).*
Xiao et al., "Object Detection Based on Contour Learning and Template Matching", Proceedings of the 8th World Congress on Intelligent Control and Automation Jul. 6-9, 2010, Jinan, China (Year: 2010).*
Extended European Search Report, EP20805250.6, dated Jul. 8, 2022, 11 pgs.
Guibo Zhu et al., "Feature Distilled Tracking", IEEE Transactions on Cybernetics, vol. 49, No. 2, Feb. 2019, 13 pgs.
Tencent Technology, ISR, PCT/CN2020/083 523, Jul. 7, 2020, 2 pgs.
Tencent Technology, JP Office Action, JP Patent Application No. 2021-536356, dated Oct. 11, 2022, 7 pgs.
Tencent Technology, WO, PCT/CN2020/083523, Jul. 7, 2020, 5 pgs.
Tencent Technology, IPRP, PCT/CN2020/083523, Nov. 16, 2021, 6 pgs.

* cited by examiner

METHOD, APPARATUS, TERMINAL, AND STORAGE MEDIUM FOR TRAINING MODEL

CROSS-REFERENCE TO RELATED APPLICATIONS

This application is a continuation application of PCT Patent Application No. PCT/CN2020/083523, entitled "METHOD, APPARATUS, TERMINAL, AND STORAGE MEDIUM FOR TRAINING MODEL" filed on Apr. 7, 2020, which claims priority to Chinese Patent Application No. 201910397253. X, entitled "METHOD, APPARATUS, TERMINAL, AND STORAGE MEDIUM FOR TRAINING MODEL" and filed with the National Intellectual Property Administration, PRC on May 13, 2019, both of which are incorporated herein by reference in their entirety.

FIELD OF THE TECHNOLOGY

This application relates to the technical field of Internet, and in particular, to a method, apparatus, terminal, and storage medium for training a model.

BACKGROUND OF THE DISCLOSURE

With the development of science and technology, a computer vision technology becomes a currently popular research field. Visual object tracking is an important research direction in the computer vision field. The so-called visual object tracking means predicting a size and a position of a tracked object in other images when a size and a position of the tracked object in a specific image are known. The visual object tracking is generally applicable to application scenarios that require high real-time performance, such as video monitoring, human-machine interaction, unmanned driving, and the like. For example, when a size and a position of a tracked object in a specific frame of image in a specific video sequence are given, a size and a position of the tracked object in a subsequent frame of image of the video sequence are predicted.

SUMMARY

Embodiments of this application provide a method, apparatus, terminal, and storage medium for training a model, which can train a first object recognition model more desirably, so that a first object recognition model obtained through the update training has more desirable visual object tracking performance and is more applicable to a visual object tracking scenario, thus improving accuracy of visual object tracking.

In an aspect, an embodiment of this application provides a method for training a model, which is performed by the computing device, the method including:

acquiring a template image and a test image for the training, the template image and the test image each including a tracked object, the test image including a tracking label of the tracked object, the tracking label being used for indicating a marking position of the tracked object in the test image;

invoking a first object recognition model to recognize a feature of the tracked object in the template image to obtain a first reference response, and invoking a second object recognition model to recognize the feature of the tracked object in the template image to obtain a second reference response;

invoking the first object recognition model to recognize a feature of the tracked object in the test image to obtain a first test response, and invoking the second object recognition model to recognize the feature of the tracked object in the test image to obtain a second test response;

tracking the first test response to obtain a tracking response of the tracked object, the tracking response being used for indicating a tracking position of the tracked object in the test image; and updating the first object recognition model based on difference information between the first reference response and the second reference response, difference information between the first test response and the second test response, and difference information between the tracking label and the tracking response.

In another aspect, an embodiment of this application provides an apparatus for training a model, the apparatus including:

an acquiring unit configured to acquire a template image and a test image for the training, the template image and the test image each including a tracked object, the test image including a tracking label of the tracked object, the tracking label being used for indicating a marking position of the tracked object in the test image;

a processing unit configured to: invoke a first object recognition model to recognize a feature of the tracked object in the template image to obtain a first reference response, and invoke a second object recognition model to recognize the feature of the tracked object in the template image to obtain a second reference response, invoke the first object recognition model to recognize a feature of the tracked object in the test image to obtain a first test response, and invoke the second object recognition model to recognize the feature of the tracked object in the test image to obtain a second test response, and track the first test response to obtain a tracking response of the tracked object, the tracking response being used for indicating a tracking position of the tracked object in the test image; and an updating unit configured to update the first object recognition model based on difference information between the first reference response and the second reference response, difference information between the first test response and the second test response, and difference information between the tracking label and the tracking response.

In another aspect, an embodiment of this application provides a terminal. The terminal includes an input device and an output device, and further includes:

a processor configured to implement one or more instructions; and a computer storage medium, storing one or more instructions, the one or more instructions being configured to be loaded by the processor to perform the following steps:

acquiring a template image and a test image for the training, the template image and the test image each including a tracked object, the test image including a tracking label of the tracked object, the tracking label being used for indicating a marking position of the tracked object in the test image;

invoking a first object recognition model to recognize a feature of the tracked object in the template image to obtain a first reference response, and invoking a second object recognition model to recognize the feature of the tracked object in the template image to obtain a second reference response;

invoking the first object recognition model to recognize a feature of the tracked object in the test image to obtain a first test response, and invoking the second object recognition model to recognize the feature of the tracked object in the test image to obtain a second test response;

tracking the first test response to obtain a tracking response of the tracked object, the tracking response being used for indicating a tracking position of the tracked object in the test image; and updating the first object recognition model based on difference information between the first reference response and the second reference response, difference information between the first test response and the second test response, and difference information between the tracking label and the tracking response.

In still another aspect, an embodiment of this application provides a computer storage medium, storing one or more instructions, the one or more instructions being configured to be loaded by a processor to perform the following steps:

acquiring a template image and a test image for the training, the template image and the test image each including a tracked object, the test image including a tracking label of the tracked object, the tracking label being used for indicating a marking position of the tracked object in the test image;

invoking a first object recognition model to recognize a feature of the tracked object in the template image to obtain a first reference response, and invoking a second object recognition model to recognize the feature of the tracked object in the template image to obtain a second reference response;

invoking the first object recognition model to recognize a feature of the tracked object in the test image to obtain a first test response, and invoking the second object recognition model to recognize the feature of the tracked object in the test image to obtain a second test response;

tracking the first test response to obtain a tracking response of the tracked object, the tracking response being used for indicating a tracking position of the tracked object in the test image; and updating the first object recognition model based on difference information between the first reference response and the second reference response, difference information between the first test response and the second test response, and difference information between the tracking label and the tracking response.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1A:
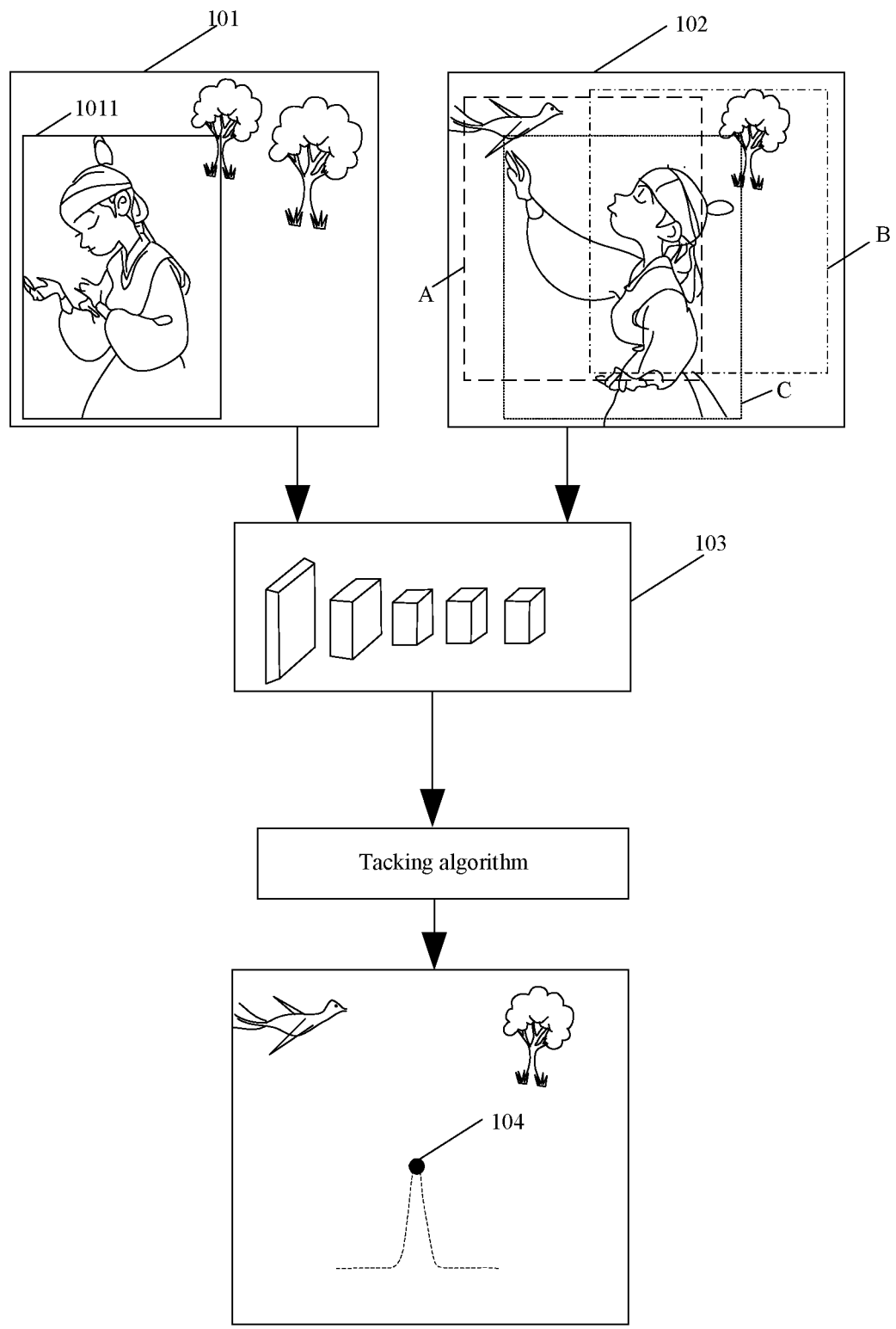
FIG. 1a is a scenario diagram of visual object tracking based on a first object recognition model according to an embodiment of this application.

The following clearly and completely describes technical solutions in embodiments of this application with reference to the accompanying drawings in the embodiments of this application.

Currently, visual object tracking mainly adopts a traditional image processing model to achieve tracking. However, the inventor found in practice that traditional image processing model is designed to achieve image classification tasks and is obtained through training by using image classification data. However, the visual object tracking is not intended for the image classification task. Therefore, the traditional image processing model is not applicable to the visual object tracking scenario, resulting in low accuracy of the visual object tracking.

The embodiments of this application provide a first object recognition model, which is an image recognition model having an image recognition function, such as a visual geometry group (VGG) model, a GoogleNet Model, a deep residual network (ResNet) model, or the like. The first object recognition model can accurately extract a feature of an image and the extracted feature is more applicable to a visual object tracking scenario. Therefore, applying a combination of the first object recognition model and a related tracking algorithm to the visual object tracking scenario can improve the accuracy and real-time performance of the visual object tracking.

Specifically, implementing the visual object tracking by using the first object recognition model and the tracking algorithm may include the following steps: (1): Acquire a to-be-processed image and a reference image including a tracked object. The tracked object is an image element in the reference image that needs to be tracked, such as a person, an animal, or the like in the reference image. The reference image may include marking information of the tracked object, and the marking information is used for indicating a size and a position of the tracked object. In an embodiment of this application, the marking information may be represented in a form of a marking box, such as a marking box shown in 101 in FIG. 1. (2): Determine, according to the marking information in the reference image, predicted tracked objects included in the to-be-processed image. The predicted tracked objects herein are image elements in the to-be-processed image that may be the tracked object. In an embodiment of this application, in (2), a plurality of candidate boxes may be generated in the to-be-processed image according to a size of the marking box in the reference image. Each of the candidate boxes represents a predicted tracked object. For example, A, B, and C of FIG. 1 below indicate three determined predicted tracked objects. (3): Invoke the first object recognition model to recognize the tracked object in the reference image to obtain a first recognition feature. The first recognition feature is a feature of the tracked object, such as a facial contour feature, an eye feature, a posture feature, or the like of the tracked object. (4): Invoke the first object recognition model to recognize the predicted tracked objects included in the to-be-processed image to obtain second recognition features. The second recognition features are features of the predicted tracked objects, such as a facial contour feature, an eye feature, a nose feature, a posture feature, or the like of the predicted tracked objects. (5): Determine, based on the first recognition feature and the second recognition features, a target feature for tracking, and tracking the target feature by using the tracking algorithm to obtain a position of the tracked object in the to-be-processed image. In an embodiment, the tracking algorithm may include a correlation filter tracking algorithm, a dual network-based tracking algorithm, a sparse representation-based algorithm, or the like. The correlation filter tracking algorithm is taken as an example in this embodiment of this application. After the target feature is tracked by using the correlation filter tracking algorithm, a Gaussian-shaped response graph is obtained. A position of a peak on the response graph represents a tracked position of the tracked object in the to-be-processed image.

The target feature for tracking determined according to the first recognition feature and the second recognition feature may be understood as follows: By analyzing the feature of the tracked object and the features of the predicted tracked objects, a predicted tracked object is determined from the predicted tracked objects as the tracked object included in the to-be-processed image, so as to subsequently process the feature of the predicted tracked object by using the tracking algorithm to obtain a position of the tracked object in the to-be-processed image, thereby completing the tracking of the tracked object. In an embodiment, an implementation of step (5) may include: scoring matching rates between the first recognition feature and the second recognition features, and determining, as the target feature, a second recognition feature having a highest matching score. In other embodiments, the implementation of step (5) may further include: fusing the second recognition features, and determining a fused result as the target feature.

For example, FIG. 1 shows a scenario of visual object tracking according to an embodiment of this application. 101 represents a reference image, 102 is a to-be-processed image, and 1011 represents marking information of a tracked object represented in a form of a marking box. A size of the marking box 1101 represents a size of the tracked object in the reference image, and a position of the marking box 1101 represents a position of the tracked object in the reference image. 103 represents a first object recognition model. It is assumed that three predicted tracked objects A, B, and C are generated in the to-be-processed image 102 according to the marking box 1011. The first object recognition model 103 is invoked to recognize 1011 to obtain a first recognition feature, and the first object recognition model is invoked to recognize the predicted tracked objects A, B, and C to obtain three second recognition features. Further, a target feature is determined based on the first recognition feature and three second recognition features. It is assumed that the second recognition feature corresponding to the predicted tracked object C is determined as the target feature. Then the target object is tracked by using a tracking algorithm such as a correlation filter tracking algorithm, to obtain a Gaussian-shaped response graph. A peak point on the response graph represents a position of the tracked object in the to-be-processed image, as shown by 104.

Based on the above first object recognition model, an embodiment of this application further provides a method for training a model, which is used for training the first object recognition model to ensure that the first object recognition model can accurately extract a feature from an image and that the extracted feature is more applicable to a tracking scenario. Specifically, the method for training a model may be performed by a computing device such as a terminal, and specifically may be performed by a processor of the terminal. The terminal may include but is not limited to a smart terminal, a tablet computer, a laptop computer, a desktop computer, or the like.

Figure 1B:
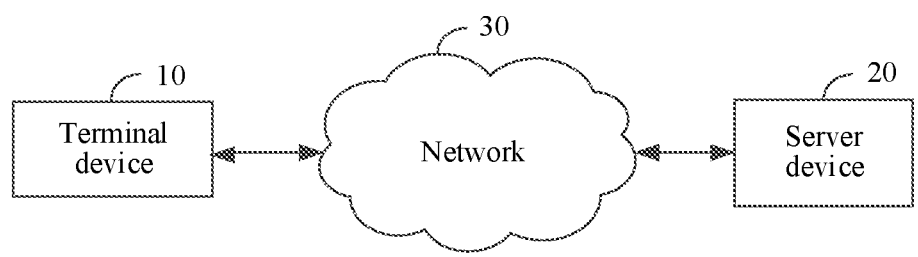
FIG. 1b is a schematic diagram of an implementation environment of a method for training a model according to an embodiment of this application.

FIG. 1*b* is a schematic diagram of an implementation environment of a method for training a model according to an embodiment of this application. The apparatus for training a model provided in any embodiment of this application is integrated in the terminal device 10 and the server device 20, to implement the method for training a model provided in any embodiment of this application.

Figure 2:
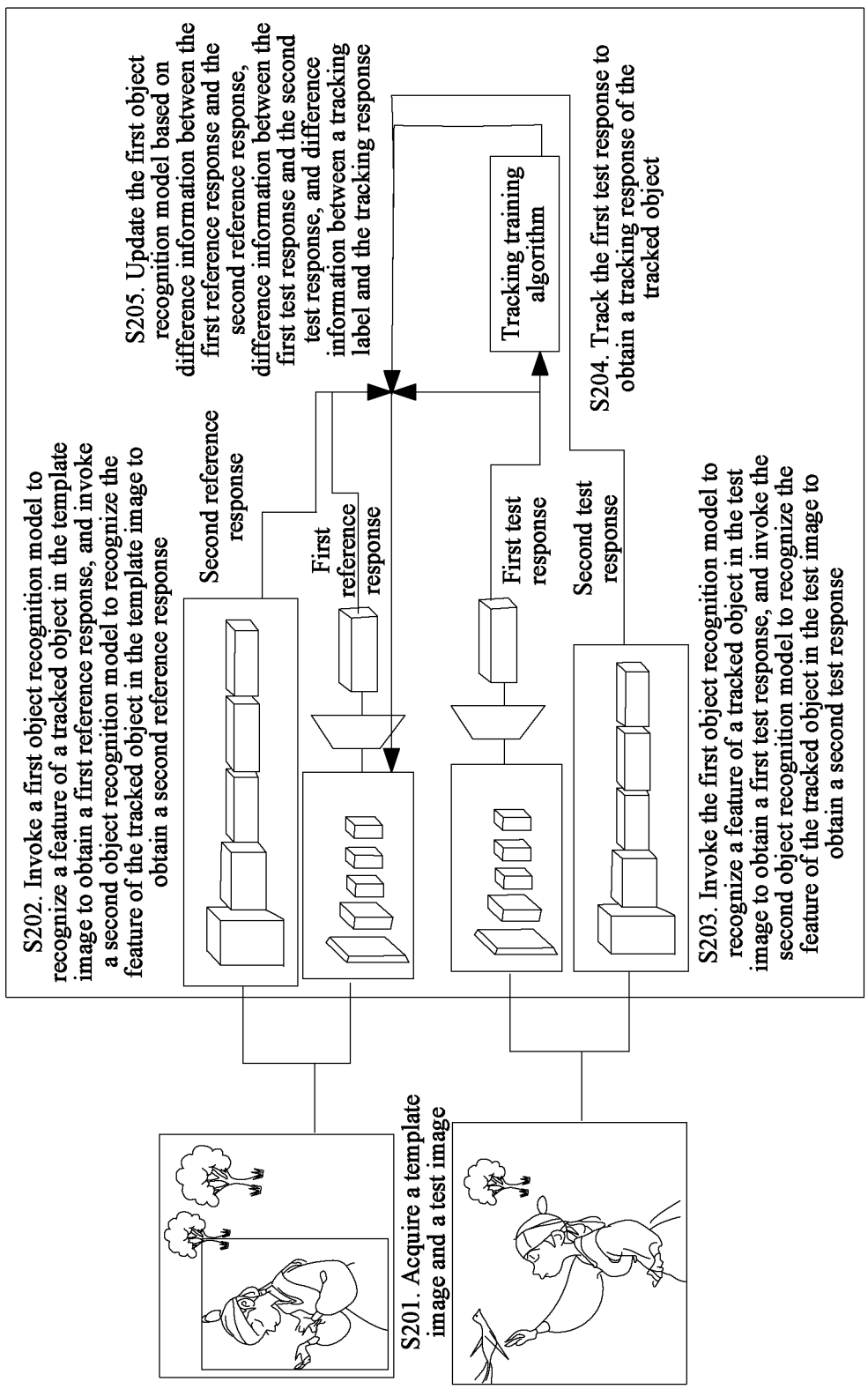
FIG. 2 is a schematic flowchart of a method for training a model according to an embodiment of this application.

Referring to FIG. 2, the method for training a model provided in this embodiment of this application may include the following steps S201 to S205:

Step S201: Acquire a template image and a test image for the training.

The template image and the test image are images used for training and updating the model, which both include a tracked object. The template image may further include marking information of the tracked object. The marking information of the tracked object herein is used for representing a size and a position of the tracked object in the template image. The marking information may be marked by a terminal for the template image. The test image further includes a response label corresponding to the test image. The response label is used for indicating a marking position of the tracked object in the test image. The marking position may be a real position of the tracked object in the test image that is marked by the terminal. The test image may further include marking information of the tracked object. The marking information of the tracked object is used for indicating a size and a position of the tracked object in the test image.

In an embodiment, the template image and the test image may be the two frames of images of the same video sequence. For example, a video sequence including a tracked object may be recorded by using a camera, and any frame of image in the video sequence that includes the tracked object is selected as the template image, and a frame of image in the video sequence that includes a tracked object other than the template image is selected as the test image.

In other embodiments, the template image and the test image may also not be the images of the same video sequence. For example, the template image may be an image obtained by a camera apparatus by taking a photograph of a first to-be-captured scene including a tracked object, and the test image is an image obtained by the camera apparatus by taking a photograph of a second to-be-captured scene including a tracked object before or after the template image is obtained, that is, the template image and the test image are two independent images.

The images of the same video sequence usually have a semantic context relationship, which therefore more facilitate training of the first object recognition model and result in more desirable performance of an updated first object recognition model obtained through training compared to the template image and the test image independent of each other. Therefore, in the embodiments of this application, the template image and the test image are in the same video sequence, for example.

Step S202: Invoke a first object recognition model to recognize a feature of the tracked object in the template image to obtain a first reference response, and invoke a second object recognition model to recognize the feature of the tracked object in the template image to obtain a second reference response.

Step S203: Invoke the first object recognition model to recognize a feature of the tracked object in the test image to obtain a first test response, and invoke the second object recognition model to recognize the feature of the tracked object in the test image to obtain a second test response.

A similarity between the first object recognition model and the second object recognition model is that the first object recognition model and the second object recognition model both have an image recognition function. In an embodiment of this application, since a convolutional neural network model becomes a currently frequently used image recognition model because of its relatively high feature extraction performance, the first object recognition model and the second object recognition model in this embodiment of this application each may be the convolutional neural network model, such as a VGG model, a GoogleNet model, a ResNet model, or the like. A difference between the first object recognition model and the second object recognition model is that the second object recognition model is an updated image recognition model or a pre-trained and tested model used for image recognition, and the first object recognition model is a to-be-updated image recognition model.

Figure 3A:
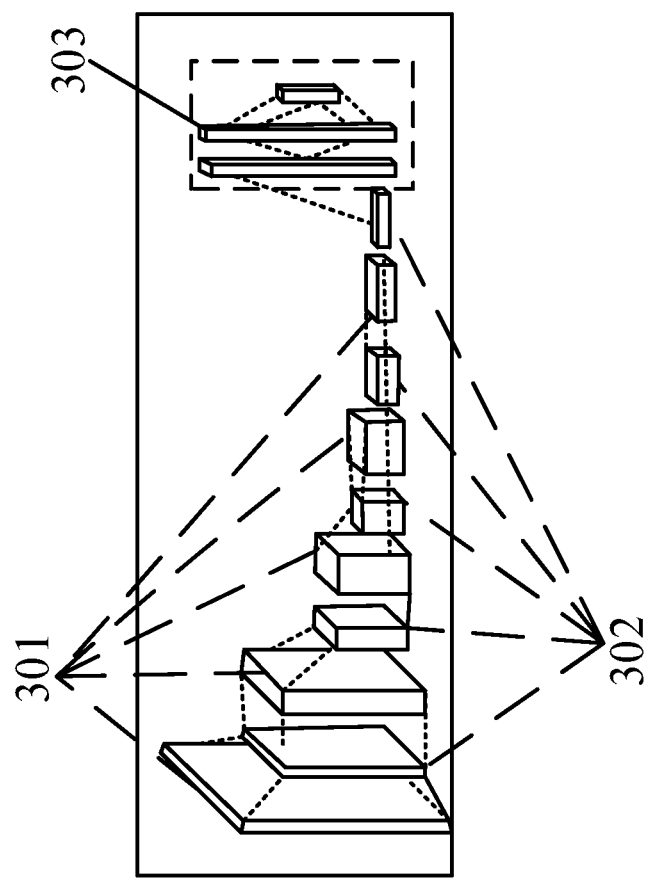
FIG. 3a is a structural diagram of a convolutional neural network according to an embodiment of this application.

The convolutional neural network model is mainly applicable to image recognition, facial recognition, text recognition, and the like. A network structure of the convolutional neural network may be shown in FIG. 3a, which mainly includes a convolutional layer 301, a pooling layer 302, and a fully connected layer 303. Each convolutional layer is connected to a pooling layer. The convolutional layer 301 is mainly used for feature extraction. The pooling layer 302, also referred to as a sampling sub-layer, is mainly configured to reduce an amount of input data. The fully connected layer 303 calculates classification values of classes according to features extracted by the convolutional layer, and finally outputs the classes and respective classification values. It may be learned that network structures of the first object recognition model and the second object recognition model each also include a convolutional layer, a pooling layer, and a fully connected layer.

Each convolutional neural network model includes a plurality of convolutional layers responsible for extracting different features of an image. A feature extracted by a previous convolutional layer is used as an input of a next convolutional layer. The feature to be extracted by each of the convolutional layers may be set according to a specific function or may be artificially set. For example, for image recognition of graphics, a first convolutional layer may be configured to extract an overall shape feature of a graph, a second convolutional layer may be configured to extract a line feature of the graph, and a third convolutional layer may be configured to extract a discontinuous feature of the graph.

For another example, for recognition of images including a human face, the first convolutional layer may be configured to extract an outline feature of the human face, and the second convolutional layer may be configured to extract features of the five sense organs of the human face. Each of the convolutional layers includes a plurality of filters having the same size for convolutional computation. Each of the filters corresponds to a filter channel. Each of the filters obtains a group of features after the convolutional computation. Therefore, each of the convolutional layers recognizes an inputted image to extract multi-dimensional features. More convolutional layers indicate a deeper network structure of the convolutional neural network model and more extracted features. More filters included in each of the convolutional layers indicate a higher feature dimension of each of the convolutional layers.

It is to be understood that if a model includes a relatively large number of convolutional layers and/or each of the convolutional layers includes a relatively large number of filters, a relatively large storage space is required for storing the model. The model requiring a relatively large storage space is referred to as a heavyweight model. Conversely, if a model includes few convolutional layers and/or each of the convolutional layers includes few filters, a relatively large storage space is not required for storing the model. The model requiring a relatively small storage space is referred to as a lightweight model.

In an embodiment of this application, the first object recognition model and the second object recognition model both may be a heavyweight model, or the second object recognition model is a heavyweight model, and the first object recognition model is a lightweight model obtained by performing model compression on the second object recognition model. If the first object recognition model is a heavyweight model, the updated first object recognition model can extract a high-dimension feature, which has desirable recognition performance. By applying the updated first object recognition model to a visual object tracking scenario, tracking accuracy can be improved. If the first object recognition model is a lightweight model obtained by performing model compression on the second object recognition model, the updated first object recognition model has similar feature extraction performance as the second object recognition model, and is effectively applied to mobile devices and other low power-consumption products due to requiring a smaller storage space. In addition, if the updated first object recognition model is applied to the visual object tracking scenario, features can be quickly extracted, thereby implementing real-time performance of visual object tracking. In practical applications, the first object recognition model may be selectively used as a lightweight model or a heavyweight model according to specific scenario requirements.

It may be learned from the embodiment of FIG. 1 that, in the field of visual object tracking, one of main factors that affects the tracking accuracy is whether the feature extracted by the first object recognition model is accurate. Feature extraction of the first object recognition model mainly depends on the convolutional layer. Therefore, in this embodiment of this application, updating the first object recognition model actually means training the convolutional layer of the first object recognition model to improve the feature extraction performance of the first object recognition model. Based on this, step S202 of invoking the first object recognition model to recognize the feature of the tracked object in the template image to obtain the first reference response actually means invoking the convolutional layer in the first object recognition model to extract the feature of the tracked object in the template image to obtain the first reference response.

The first reference response is used for representing the feature of the tracked object in the template image that is recognized by the first object recognition model, such as a size, a shape, a contour, and the like. The first reference response may be represented by using a feature map. Likewise, the second reference response is used for representing the feature of the tracked object in the template image that is recognized by the second object recognition model. The first test response is used for representing the feature of the tracked object in the test image that is recognized by the first object recognition model. The second test response is used for representing the feature of the tracked object in the test image that is recognized by the second object recognition model.

In an embodiment, it may be learned from the above that the template image may include the marking information of the tracked object. The marking information may be used for determining a size and a position of a tracked object in the template image that needs to be recognized by the first object recognition model, so that the first object recognition model can accurately determine which one needs to be recognized. The marking information of the tracked object in the template image may be represented by using a marking box. In an embodiment of this application, invoking the first object recognition model to recognize the feature of the tracked object in the template image to obtain the first reference response may mean invoking the first object recognition model to recognize the template image by using the marking information in the template image. For example, it is assumed that the marking information in the template image is represented in the form of a marking box. In this case, invoking the first object recognition model to recognize the feature of the tracked object in the template image to obtain the first reference response may mean recognizing a feature of the marking box in the template image.

In other embodiments, if the template image includes only the tracked object, or includes the tracked object and background that does not affect the recognition of the tracked object, such as a wall, the ground, sky, and the like, the first object recognition model can accurately determine which one needs to be recognized regardless of whether the terminal sets marking information of the tracked object for the template image.

In an embodiment, an implementation of invoking the first object recognition model to recognize the feature of the tracked object in the template image to obtain the first reference response may be: using the template image as an input of the first object recognition model, and performing, by the first convolutional layer of the first object recognition model, convolutional computation on the template image by using a plurality of filters of a specific size to extract a first feature of the tracked object in the template image; using the first feature as an input of the second convolutional layer, and performing, by the second convolutional layer, convolutional computation on the first feature by using the plurality of filters to extract a second feature of the tracked object in the template image; and inputting the second feature to the third convolutional layer, and performing, by the third convolutional layer, convolutional computation on the second feature by using the plurality of filters to obtain a third feature of the tracked object in the template image, and so on. An output result obtained when a last convolutional layer completes convolutional computation is the first reference response. Implementations of invoking the first object recognition model to recognize the test image to obtain the first test response, invoking the second object recognition model to recognize the template image to obtain the second reference response, and invoking the second object recognition model to recognize the test image to obtain the second test response may be the same as the above implementation. Details are not described herein one by one herein.

Step S204: Track the first test response to obtain a tracking response of the tracked object.

In order to ensure that the first object recognition model is applicable to the visual object tracking scenario, in addition to ensuring high feature extraction performance of the first object recognition model, it is further necessary to ensure that the features extracted by the first object recognition model are more applicable to the tracking scenario, or in other words, more applicable to a tracking algorithm. Based on this, tracking training on the first object recognition model is implemented through step S204 in this embodiment of this application.

In an embodiment, step S204 may include: tracking the first test response by using a tracking training algorithm to obtain the tracking response of the tracked object. The tracking training algorithm is an algorithm used for tracking training on the first object recognition model, which may include a correlation filter tracking algorithm, a dual network-based tracking algorithm, a sparse representation-based algorithm, and the like. The tracking response is used for indicating the tracking position of the tracked object in the test image that is determined according to the tracking training algorithm and the first test response. In fact, the tracking position may be understood as a position of the tracked object in the test image that is predicted according to the tracking training algorithm and the first test response.

In an embodiment, if the tracking training algorithm is the correlation filter tracking algorithm, an implementation of tracking the first test response by using the tracking training algorithm to obtain the tracking response of the tracked object may be: tracking the first test response by using the tracking training algorithm to obtain a Gaussian-shaped response graph, and determining the tracking response according to the Gaussian-shaped response graph. In an embodiment of this application, an implementation of determining the tracking response according to the Gaussian-shaped response graph may be: using the response graph used as the tracking response. Thus, the response graph can reflect the tracking position of the tracked object in the test image. Specifically, a maximum value point or a peak point in the response graph may be used as the tracking position of the tracked object in the test image.

In step S401, the tracking label is used for indicating a marking position of the tracked object in the test image. The marking position may be a real position of the tracked object in the test image that is pre-marked by the terminal. In an embodiment, the tracking label may also be a Gaussian-shaped response graph. A peak point in the response graph indicates a real position of the tracked object in the test image.

Figure 3B:
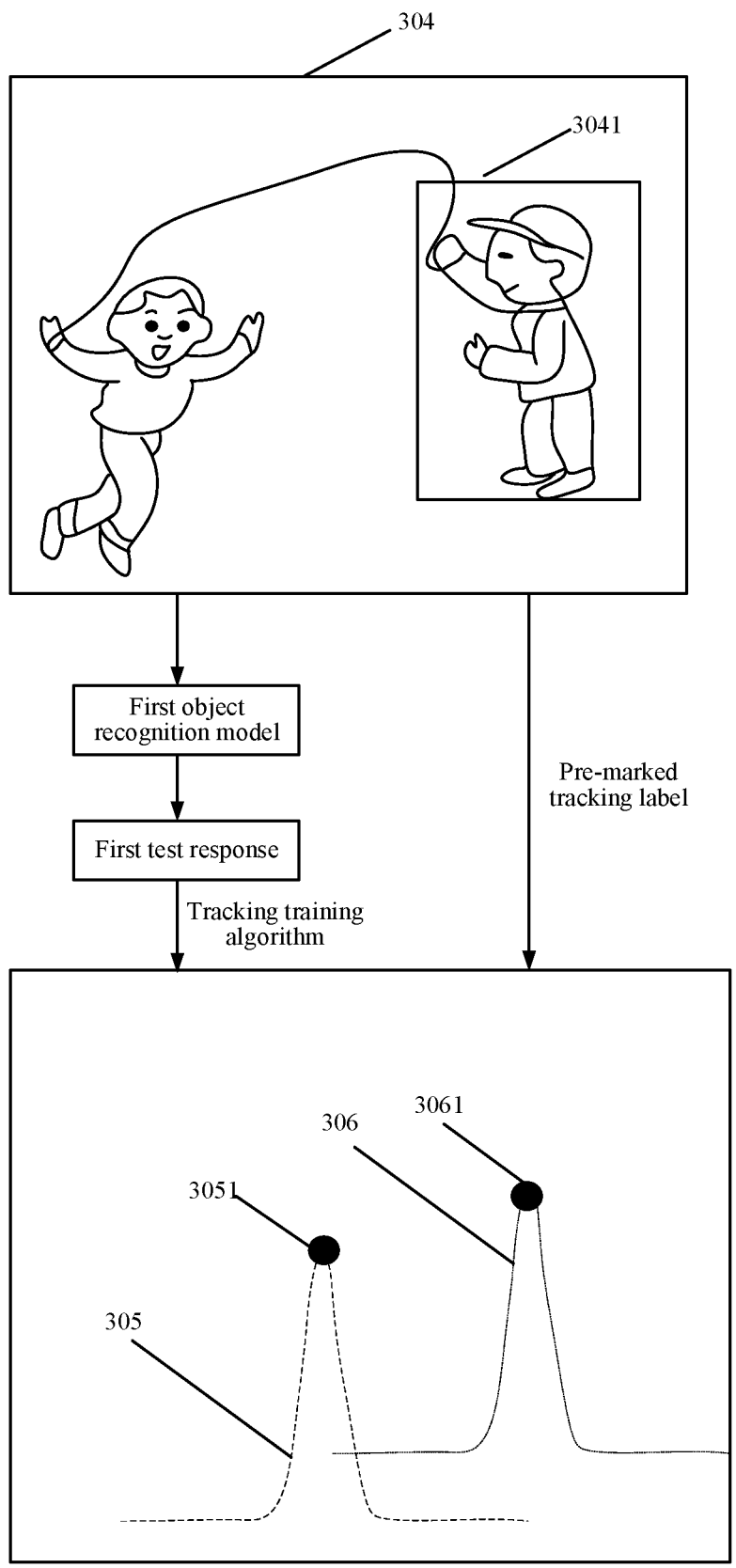
FIG. 3b is a schematic diagram of determining a tracking response and a tracking label according to an embodiment of this application.

For example, FIG. 3b is a schematic diagram of determining the tracking response and the tracking label according to an embodiment of this application. It is assumed that 304 represents the test image, and 3041 represents the tracked object. A tracking label pre-marked by the terminal for the test image may be shown by 306 in FIG. 3b, and a peak point 3061 on 306 represents a marking position of the tracked object in the test image. The first object recognition model is invoked to recognize 304 to obtain a first test response. The first test response is then tracked by using the tracking training algorithm such as the correlation filter tracking algorithm, to obtain a tracking response shown by, for example, 305. A peak point 3051 on 305 indicates the tracking position of the tracked object in the test image.

In other embodiments, if other tracking training algorithms are used to track the first test response, the tracking response may be determined according to a feature of a specific tracking training algorithm.

Step S205: Update the first object recognition model based on difference information between the first reference response and the second reference response, difference information between the first test response and the second test response, and difference information between the tracking label and the tracking response.

It may be learned from the above that the first reference response is used for representing the feature of the tracked object in the template image that is recognized by the first object recognition model, such as a size, a shape, a contour, and the like, and the second reference response is used for representing the feature of the tracked object in the template image that is recognized by the second object recognition model. Therefore, it may be learned that the difference information between the first reference response and the second reference response may include a difference between the features extracted by the first object recognition model and the second object recognition model by performing feature extraction on the template image.

In an embodiment, the difference between the features may be represented by a distance between the features. For example, it is assumed that the first reference response includes a facial contour of the tracked object in the template image that is recognized by the first object recognition model, which is denoted as a facial contour 1, and the second reference response includes a facial contour of the tracked object in the template image that is recognized by the second object recognition model, which is denoted as a facial contour 2. In this case, the difference information between the first reference response and the second reference response may include a distance between the facial contour 1 and the facial contour 2. In other embodiments, the difference between the features may also be represented by a similarity value between the features. A larger similarity value indicates a smaller difference between the features, and a smaller similarity value indicates a larger difference between the features.

Likewise, it may be learned that the difference information between the first test response and the second test response may include a difference between the features extracted by the first object recognition model and the second object recognition model by performing feature extraction on the test image. It may be learned from step S204 that, the difference information between the tracking label and the tracking response reflects a distance between the tracking position and the marking position of the tracked object in the test image.

During specific implementation, a value of a loss optimization function corresponding to the first object recognition model may be determined based on the difference information between the first reference response and the second reference response, the difference information between the first test response and the second test response, and the difference information between the tracking label and the tracking response, and then the first object recognition model is updated in such a way that the value of the loss optimization function is minimized. The update herein means updating model parameters in the first object recognition model. The model parameters of the first object recognition model may include, but are not limited to gradient parameters, weight parameters, and the like.

In this embodiment of this application, during training of the first object recognition model by using the second object recognition model, the first object recognition model and the second object recognition model are first respectively invoked to recognize the feature of the tracked object in the template image to obtain the first reference response and the second reference response, and then the first object recognition model and the second object recognition model are respectively invoked to recognize the feature of the tracked object in the test image to obtain the first test response and the second test response. Further, the first test response is tracked to obtain a tracking response of the tracked object. Therefore, a feature extraction performance loss of the first object recognition model compared to the second object recognition model may be determined according to the difference information between the first reference response and the second reference response and the difference information between the first test response and the second test response, and a tracking performance loss of the first object recognition model may be determined according to the difference information between the tracking label and the tracking response. The first object recognition model is updated based on the feature extraction performance loss of the first object recognition model and the tracking performance loss, so that the updated first object recognition model has the same or relatively similar feature extraction performance as the second object recognition model, and the extracted features are more applicable to the visual object tracking scenario, thereby improving the accuracy of the visual object tracking.

Figure 4:
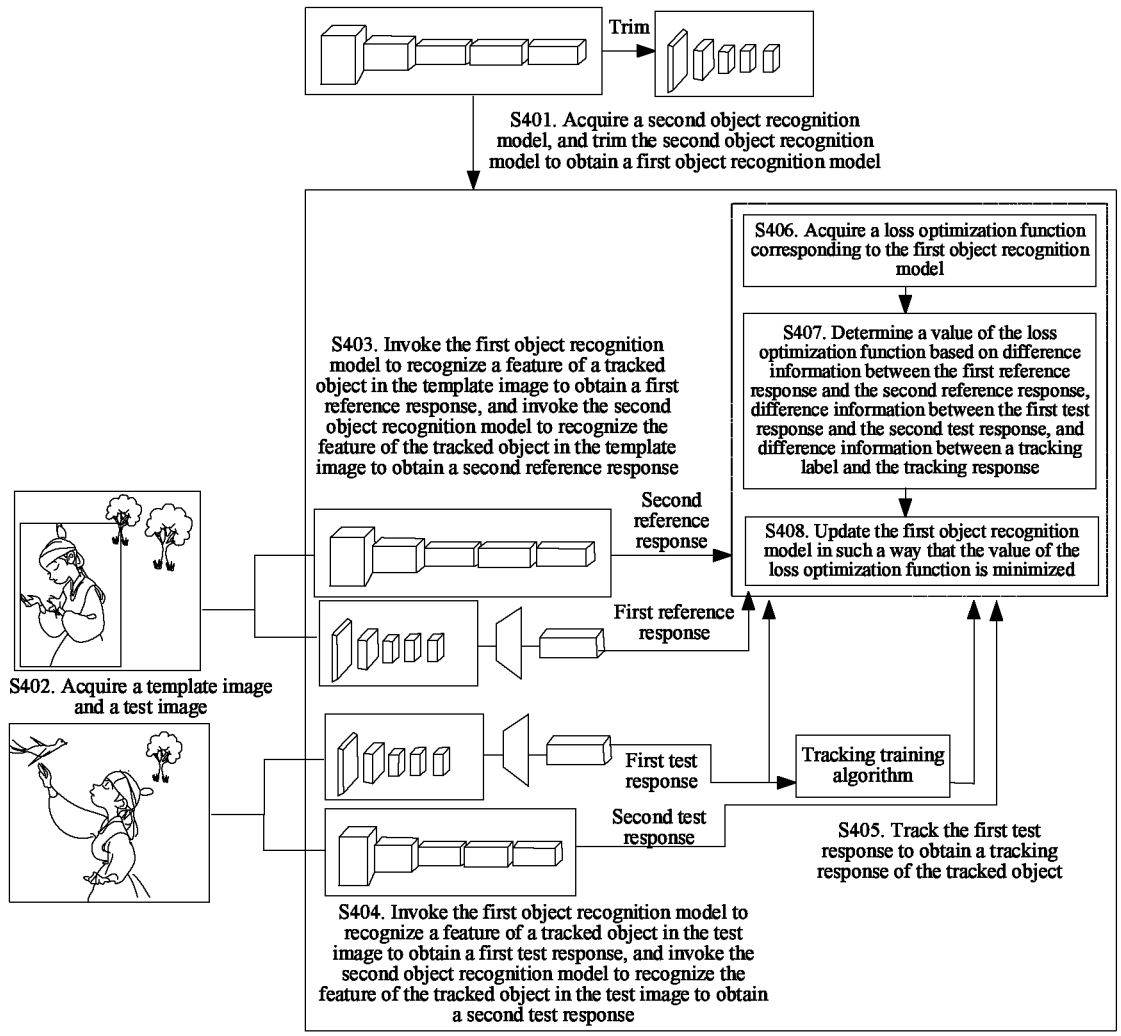
FIG. 4 is a schematic flowchart of another method for training a model according to an embodiment of this application.

FIG. 4 is a schematic flowchart of another method for training a model according to an embodiment of this application. The method for training a model may be performed by a computing device such as a terminal. The terminal herein may include, but is not limited to a smart terminal, a tablet computer, a laptop computer, a desktop computer, or the like. Referring to FIG. 4, the method for training a model may include the following steps S401 to S408:

Step S401: Acquire a second object recognition model, and trim the second object recognition model to obtain a first object recognition model.

In an embodiment of this application, the second object recognition model is a trained heavyweight model for image recognition, and the first object recognition model is a to-be-trained lightweight model for image recognition. It may be learned from the above that the lightweight first object recognition model is obtained by performing model compression on the second object recognition model. When the lightweight first object recognition model is applied to the field of visual object tracking, real-time visual object tracking can be achieved. The model compression means compressing the trained heavyweight model in time and space to remove some unimportant filters or parameters included in the heavyweight model to improve a feature extraction speed. In this embodiment of this application, the model compression may include model trimming and model training. The model trimming means that a network structure of the second object recognition model may be reduced by trimming filters and feature channels included in the model to obtain the first object recognition model. The model training means updating the trimmed first object recognition model based on a transfer learning technology by using the second object recognition model and a template image and a test image used for the training, so that the first object recognition model has the same or similar feature recognition performance as the second object recognition model.

The transfer learning technology means transferring performance of a model to another model. In this embodiment of this application, the transfer learning means invoking the second object recognition model to recognize a feature of a tracked object in the template image to obtain a second reference response and train, by using the second reference response as a supervisory label, the first object recognition model to recognize the feature of the tracked object in the template image, and then invoke the second object recognition model to recognize a feature of a tracked object in the test image to obtain a second test response and train, by using the second test response as a supervisory label, the first object recognition model to recognize the feature of the tracked object in the test image. A teacher-student model is a typical model compression manner based on the transfer learning technology. In this embodiment of this application, the second object recognition model is equivalent to a teacher model, and the first object recognition model is equivalent to a student model.

Figure 5:
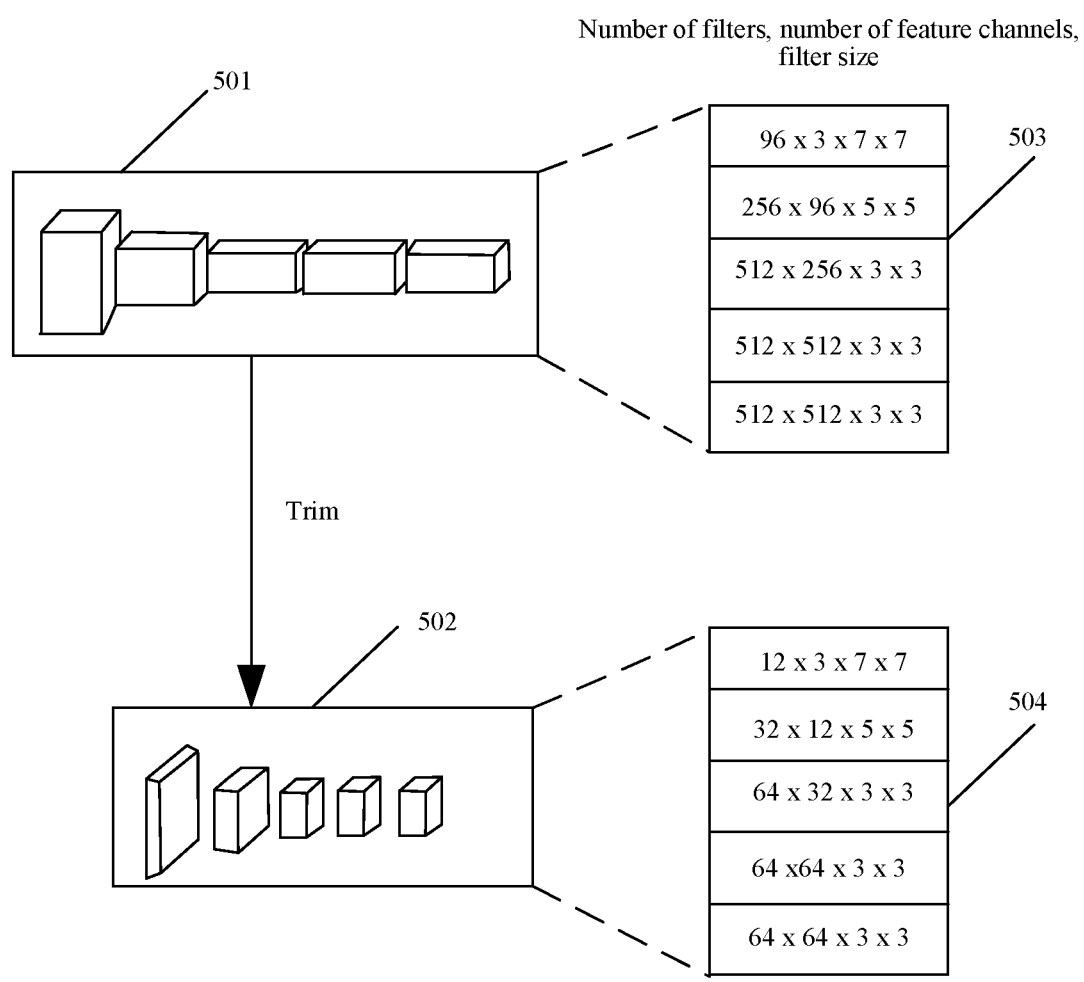
FIG. 5 is a schematic diagram of acquiring a first object recognition model according to an embodiment of this application.

In an embodiment, trimming the filters included the second object recognition model to obtain the first object recognition model may mean reducing a number of filters included in each convolutional layer in the second object recognition model by a specific number and/or reduce a number of feature channels corresponding to each convolutional layer by a corresponding number. For example, the numbers of filters and feature channels in each convolutional layer of the second object recognition model are reduced by three fifths, seven eighths, or any other number. Proved by practice, the number of filters included in each convolutional layer in the second object recognition model and the number of feature channels corresponding to each convolutional layer may be reduced by seven eighths, to obtain a desirably first object recognition model through training and updating. For example, FIG. 5 is a schematic diagram of trimming a second object recognition model to obtain a first object recognition model according to an embodiment of this application. It is to be understood that the trimming of the second object recognition model by using the above method involves only the convolutional layer. Therefore, for ease of description, only the convolutional layers of the first object recognition model and the second object recognition model are shown in FIG. 5. It is assumed that the second object recognition model is a VGG-8 model. It may be learned from the above that the first object recognition model is also a VGG-8 model. The VGG-8 model includes 5 convolutional layers. 501 represents a convolutional layer of the second object recognition model, 502 represents a convolutional layer of the first object recognition model, and 503 represents a number of filters included in each of the convolutional layers of the second object recognition model, a number of feature channels, and sizes of the filters. Based on the above description, the number of filters and the number of feature channels included in each of the convolutional layers of the second object recognition model are reduced by seven eighths to obtain a number of filters in each of the convolutional layers of the first object recognition model, a number of feature channels, and sizes of the filters, as shown in 504.

Step S402: Acquire a template image and a test image for the training, the template image and the test image each including a tracked object, the test image including a tracking label of the tracked object, the tracking label being used for indicating a marking position of the tracked object in the test image.

Step S403: Invoke the first object recognition model to recognize a feature of the tracked object in the template image to obtain a first reference response, and invoke the second object recognition model to recognize the feature of the tracked object in the template image to obtain a second reference response.

Step S404: Invoke the first object recognition model to recognize a feature of the tracked object in the test image to obtain a first test response, and invoke the second object recognition model to recognize the feature of the tracked object in the test image to obtain a second test response.

Step S405: Track the first test response to obtain a tracking response of the tracked object.

In an embodiment, an implementation of step S405 may include tracking the first test response by using a tracking training algorithm to obtain the tracking response of the tracked object. The tracking training algorithm may include a tracking algorithm parameter. An implementation of tracking the first test response by using the tracking training algorithm to obtain the tracking response, in the test image, to the tracked object may be: substituting the first test response into the tracking training algorithm with a known tracking algorithm parameter for calculation, and determining the tracking response according to a calculated result. The tracking algorithm parameter in the tracking training algorithm in this embodiment of this application is obtained by training the tracking training algorithm according to the second object recognition model and the template image. For example, the tracking training algorithm is a correlation filter tracking algorithm. A process of training the tracking training algorithm by using the second object recognition model and the template image to obtain a tracking algorithm parameter of the correlation filter tracking algorithm is described below. The tracking algorithm parameter of the correlation filter tracking algorithm is a filter parameter of a correlation filter parameter, and the process of training the correlation filter tracking algorithm may include steps S11-13.

Step S11: Generate a training sample according to the template image, and acquire a tracking label corresponding to the training sample.

In an embodiment, the template image includes a tracked object and a tracking label corresponding to the tracked object, and the training sample generated according to the template image also includes the tracked object. The tracking label corresponding to the tracked object included in the template image may be a real position of the tracked object in the template image, which may be pre-labelled by a terminal. In an embodiment of this application, the training sample may be generated according to the template image in the following manner: trimming out an image block including the tracked object in the template image, and performing cyclic shift on the image block to obtain the training sample. A tracking label corresponding to the training sample is determined according to the tracking label included in the template image and a degree of the cyclic shift operation.

The cyclic shift may be performed on the template image in the following manner: pixelizing the image block of the template image, and determining pixels used for representing the tracked object. The pixels form a pixel matrix of the tracked object, and cyclic shift is performed each row in the pixel matrix to obtain a plurality of new pixel matrices. During the above cyclic shift, a value of each pixel is not changed, but only a position of the pixel is changed. Since the value of the pixel is not changed, a cyclically shifted matrix is still used for representing the tracked object. Since the position of the pixel is changed, a position of a tracked object rendered by a new pixel matrix is changed.

The cyclic shift performed on each row in the pixel matrix may include: representing each row in the pixel matrix as an n×1 vector, each vector element in the vector corresponding to a pixel; and successively moving the pixels in the n×1 vector rightward or leftward, a new set of vectors being obtained after each movement.

Step S12: Invoke the second object recognition model to extract a feature of the training sample to obtain a feature of a tracked object in the training sample.

Invoking the second object recognition model to extract features of a plurality of training samples actually means invoking a convolutional layer of the second object recognition model to extract the features of the training samples. The second object recognition model includes a plurality of convolutional layers each including a plurality of filters used for convolutional computation. Therefore, features extracted by each of the convolutional layers are multi-dimensional, and the multi-dimensional features extracted by each of the convolutional layers are successively used as an input of a next one of the convolutional layers until an output of a last one of the convolutional layers is obtained. For example, the second object recognition model includes 5 convolutional layers. After the 5 convolutional layers perform feature extraction on the training sample, a feature of the training sample having a dimension D is obtained. If $\varphi_i(\bullet)$ represents a dimension feature extracted by the second object recognition model, a final feature for the training extracted by the second object recognition model is $(\varphi_1(x), \varphi_2(x), \varphi_3(x) \ldots \varphi_D(x))$.

Step S13: Acquire a ridge regression equation for determining the correlation filter parameter, and acquiring a solution of the ridge regression equation to obtain the correlation filter parameter.

A working principle of the correlation filter tracking algorithm includes: extracting a feature of an image including the tracked object; performing convolutional computation on the extracted feature and a correlation filter to obtain a response graph, and determining a position of the tracked object in the image from the response graph. Since the convolutional computation can be performed only between two same quantities, it is necessary to ensure that a dimension of the correlation filter and a dimension of the feature of the training sample are the same. The ridge regression equation corresponding to the correlation filter tracking algorithm may be expressed as equation (1):

$$\min_w \left\| \sum_i^D \varphi_i(x) \star w_i - y \right\|^2 + \lambda \sum_i^D \|w_i\|^2. \tag{1}$$

★ represents the convolutional computation, D represents the dimension of the feature of the training sample that is extracted by the second object recognition model, $w_i$ represents an $i^{th}$-dimension filter parameter of the correlation filter, x represents the training sample, y represents the tracking label of the training sample x, $\varphi_i(x)$ represents the $i^{th}$-dimension feature of the training sample x, and $\lambda$ represents a regularization coefficient.

By minimizing the ridge regression equation shown in equation (1), filter parameters of all dimensions of the correlation filter can be obtained. Specifically, equation (1) is minimized and a solution of equation (1) is acquired in a frequency domain to obtain the filter parameters of all dimensions of the correlation filter. The equation for acquiring the filter parameter in the frequency domain is described by using an example of acquiring a $d^{th}$-dimension filter parameter. The equation for acquiring the $d^{th}$-dimension filter parameter is expressed as (2):

$$\hat{w}_d = \frac{\hat{y}^* \odot \hat{\varphi}_d(x)}{\sum_{i=1}^D \hat{\varphi}_i(x) \odot \hat{\varphi}_i^*(x) + \lambda} \tag{2}$$

In equation (2), $w_d$ represents a correlation filter parameter corresponding to a $d^{th}$ convolutional layer, $\odot$ represents a point multiplication operation, $\hat{\bullet}$ represents discrete Fourier transformation, and $\bullet^*$ represents a complex conjugate operation. The filter parameters of all dimensions of the correlation filter may be calculated according to equation (2), and the filter parameters of all dimensions constitute the filter parameter of the correlation filter tracking algorithm.

After the filter parameter of the correlation filter is obtained by training the correlation filter tracking algorithm through steps S11 to S13, the first test response may be tracked based on the correlation filter tracking algorithm to obtain the tracking response, in the test image, to the tracked object. Specifically, tracking the first test response by using the correlation filter tracking algorithm to obtain the tracking response, in the test image, to the tracked object may be expressed as equation (3):

$$r = \mathcal{F}^{-1}(\hat{w} \odot \hat{\varphi}(z)) \tag{3}.$$

In equation (3), w represents the filter parameter of the correlation filter, $\varphi(z)$ represents the first test response, $\mathcal{F}^{-1}(\bullet)$ represents inverse discrete Fourier transformation, and r represents the tracking response.

Step S406: Acquire a loss optimization function corresponding to the first object recognition model.

In order to ensure that the first object recognition model and the second object recognition model have the same or similar feature extraction performance and that the features extracted by the first object recognition model are more applicable to the visual tracking scenario, an embodiment of this application provides joint optimization of a feature recognition loss and a tracking loss for the first object recognition model. During the joint optimization for the first object recognition model, the loss optimization function corresponding to the first object recognition model may be expressed as equation (4):

$$\mathcal{L} = \mathcal{L}_{recognition} + \lambda \mathcal{L}_{tracking} + \Upsilon \|\Theta\|^2. \tag{4}$$

In equation (4), $\mathcal{L}_{recognition}$ represents the feature recognition loss, $\mathcal{L}_{tracking}$ represents the tracking loss, $\lambda$ represents a parameter indicating significance of the feature recognition loss and the tracking loss to the optimization of the first object recognition model, where a value of the parameter may be in a range of 0-1, and a larger $\lambda$ indicates larger influence of the tracking loss on the loss optimization of the first object recognition model, $\Theta$ represents a network parameter of the first object recognition model, $\gamma$ represents a regularization coefficient, and $\gamma\|\Theta\|^2$ prevents the first object recognition model from overfitting.

Step S407: Determine a value of the loss optimization function based on the difference information between the first reference response and the second reference response, the difference information between the first test response and the second test response, and the difference information between the tracking label and the tracking response It may be learned from step S406 that the loss optimization function of the first object recognition model includes a feature recognition loss function and a tracking loss function. During determining of the value of the loss optimization function in step S407, a value of the feature recognition loss function and a value of the tracking loss function may be determined first, and then the value of the optimization loss function may be determined according to the value of the feature recognition loss function and the value of the tracking loss function.

Specifically, the determining a value of the loss optimization function based on the difference information between the first reference response and the second reference response, the difference information between the first test response and the second test response, and the difference information between the tracking label and the tracking response includes: acquiring the feature recognition loss function, and determining a value of the feature recognition loss function based on the difference information between the first reference response and the second reference response and the difference information between the first test response and the second test response; acquiring the tracking loss function, and determining a value of the tracking loss function based on the difference information between the tracking label and the tracking response; and determining the value of the loss optimization function based on the value of the feature recognition loss function and the value of the tracking loss function.

Details about the value of the feature loss recognition function: it may be learned from the above that the first reference response is used for representing the feature of the tracked object in the template image that is recognized by the first object recognition model, and the second reference response is used for representing the feature of the tracked object in the template image that is recognized by the second object recognition model. The difference information between the first reference response and the second reference response reflects a difference between the features extracted by the first object recognition model and the second object recognition model by performing feature extraction on the template image. The difference may be represented by a distance, that is, the difference information between the first reference response and the second reference response includes a distance between the first reference response and the second reference response.

Similarly, the difference information between the first test response and the second test response includes a distance between the first test response and the second test response. The feature recognition loss function means restraining the distance between the above features, so that the first object recognition model and the second object recognition model have the same or similar feature extraction performance. Therefore, it may be learned that the feature loss optimization function includes two loss parts: a feature recognition loss about the test image and a feature recognition loss about the template image.

A loss value of the feature recognition loss about the test image is determined according to the distance between the first reference response and the second reference response, and a loss value of the feature recognition loss about the template image is determined according to the first test response and the second test response. The value of the feature recognition loss function nay be calculated by substituting the loss value of the feature recognition loss of the test image and the loss value of the recognition loss of the template image into the feature recognition loss function. For example, the feature recognition loss function may be expressed as equation (5):

$$\mathcal{L}_{recognition} = \mathcal{L}_{reference} + \mathcal{L}_{test} = \|\varphi(x) - \psi(x)\|^2 + \|\varphi(z) - \psi(z)\|^2. \quad (5)$$

$\mathcal{L}_{recognition}$ represents the feature recognition loss function, $\mathcal{L}_{reference}$ represents the feature recognition loss about the template image, $\mathcal{L}_{test}$ represents the feature recognition loss about the test image, $\varphi(x)$ represents the first reference response, $\psi(x)$ represents the second reference response, $\varphi(z)$ represents the first test response, and $\psi(z)$ represents the second test response.

Details about the value of the tracking loss function: The difference between the tracking label and the tracking response reflects a Euclidean distance between the tracking response and the tracking label. Tracking performance of the first object recognition model is optimized by restraining the Euclidean distance between the tracking label and the tracking response. By substituting the Euclidean distance between the tracking response and the tracking label into the tracking loss function, a value of the tracking loss function can be obtained. For example, the tracking loss function may be expressed as equation (6):

$$\mathcal{L}_{tracking} = \|r - g\|^2, \quad (6)$$

$$\text{s.t.} \quad r = \mathcal{F}^{-1}(\hat{w} \odot \hat{\varphi}(z)). \quad (7)$$

$\mathcal{L}_{tracking}$ represents the tracking loss function, r represents the tracking response, and g represents the tracking label. r may be obtained by using equation (7). In equation (7), w represents the filter parameter of the tracking training algorithm, which may be obtained through the above steps S11 to S13.

It is to be understood that, the first object recognition model includes a plurality of convolutional layers, and the first test response is obtained by fusing sub-test responses obtained by recognizing the test image by the convolutional layers of the first object recognition model. For example, assuming that the first object recognition model includes a first convolutional layer, a second convolutional layer, and a third convolutional layer, the first test response is obtained by fusing a first test sub-response corresponding to the first convolutional layer, a second test sub-response corresponding to the second convolutional layer, and a third test sub-response corresponding to the third convolutional layer. In order to ensure that the features extracted by the first object recognition model are more applicable to the visual object tracking scenario, multi-scale tracking loss optimization may be performed on the first object recognition model.

In an embodiment of this application, in an embodiment of this application, the multi-scale tracking loss optimization means calculating tracking loss values of the plurality of convolutional layers of the first object recognition model, and then determine the value of the tracking loss function of the first object recognition model according to the tracking loss values of the plurality of convolutional layers. Specifically, assuming that the first object recognition model includes a first convolutional layer, a second convolutional layer, and a third convolutional layer, determining the value of the tracking loss function based on the difference information between the tracking label and the tracking response includes: determining a tracking loss value of the first convolutional layer based on difference information between a first tracking label corresponding to the first convolutional layer and a first tracking response obtained by tracking the first test sub-response; determining a tracking loss value of the second convolutional layer based on difference information between a second tracking label corresponding to the second convolutional layer and a second tracking response obtained by tracking the second test sub-response; determining a tracking loss value of the third convolutional layer based on difference information between a third tracking label corresponding to the third convolutional layer and a third tracking response obtained by tracking the third test sub-response; and performing multi-scale fusing on the tracking loss value corresponding to the first convolutional layer, the tracking loss value corresponding to the second convolutional layer, and the tracking loss value corresponding to the third convolutional layer to obtain the value of the tracking loss function.

The first tracking sub-response, the second tracking sub-response, and the third tracking sub-response may be obtained by tracking the first test the sub-response corresponding to the first convolutional layer, the second test sub-response corresponding to the second convolutional layer, and the third test sub-response corresponding to the third convolutional layer by using the tracking training algorithm. Since the features extracted by different convolutional layers are different, the first tracking sub-response, the second tracking sub-response, and the third tracking sub-response have different resolutions. During tracking of the test sub-responses of the different convolutional layers by using the tracking training algorithm, different tracking algorithm parameters are used. A tracking algorithm parameter for a specific convolutional layer is obtained through training by using the second object recognition model and a template image corresponding to the corresponding convolutional layer. For a specific training process, refer to steps S11 to S13, and details are not described herein again.

It is to be understood that, the plurality of convolutional layers included in the first object recognition model are connected together in a connection order. The first convolutional layer, the second convolutional layer, and the third convolutional layer described above may be any three of the convolutional layers of the first object recognition model. Alternatively, the first convolutional layer is a first one of the convolutional layers that is indicated by the connection order, the third convolutional layer is a last one of the convolutional layers that is indicated by the connection order, and the second convolutional layer being any of the convolutional layers other than the first one of the convolutional layers and the last one of the convolutional layers. In this case, the first convolutional layer may be referred to as a high-level convolutional layer of the first object recognition model, the second object recognition model is may be referred to as an intermediate-level convolutional layer of the first object recognition model, and the third convolutional layer may be referred to as a low-level convolutional layer of the first object recognition model. Proved by practice, For the first object recognition model having only 5 convolutional layers, the first convolutional layer, the last convolutional layer, and the second convolutional layer indicated by the connection order are selected for multi-scale tracking loss optimization, so that the features extracted by the first object recognition model can be more applicable to the tracking scenario.

In the case of the multi-scale tracking loss optimization, the above equation (6) may be changed to the equations (8) and (9):

$$\mathcal{L}_{tracking} = \sum_l \|r_l - g_l\|^2, \quad (8)$$

$$\text{s.t. } r_l = \mathcal{F}^{-1}(\hat{w}_l \odot \hat{\varphi}_l(z)). \quad (9)$$

l represents an $l^{th}$ convolutional layer of the first object recognition model, $r_l$ represents an $l^{th}$ tracking sub-response obtained by tracking an $l^{th}$ test sub-response of the $l^{th}$ convolutional layer by using the tracking algorithm, and $g_l$ represents a tracking label of a tracked object included in a test image corresponding to the $l^{th}$ convolutional layer. During tracking of the $l^{th}$ test sub-response of the $l^{th}$ convolutional layer by using the tracking algorithm to obtain the $l^{th}$ tracking sub-response, a tracking algorithm parameter corresponding to the $l^{th}$ convolutional layer that is used is obtained through training by using the second object recognition model and a template image corresponding to the $l^{th}$ convolutional layer. For a specific training process, refer to steps S11 to S13, and details are not described herein again.

Figure 6:
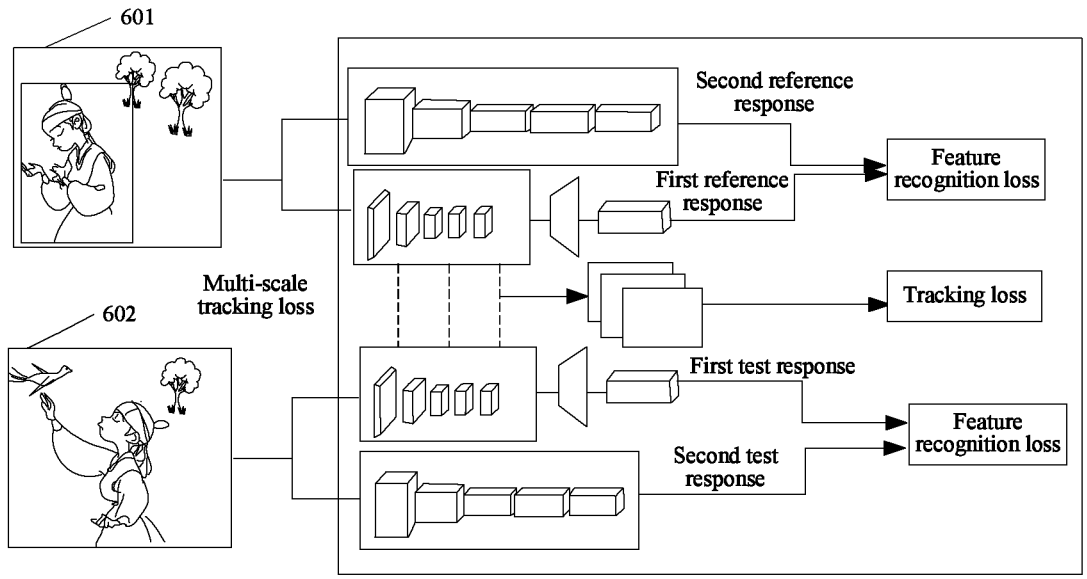
FIG. 6 is a schematic diagram of joint optimization for the first object recognition model according to an embodiment of this application.

FIG. 6 is a schematic diagram of joint optimization for the first object recognition model according to an embodiment of this application. The feature recognition loss optimization shown in the figure is expressed as equation (5), and the multi-scale tracking loss optimization is expressed by equation (8). In FIG. 6, 601 represents the first object recognition model, and 602 represents the second object recognition model.

Step S408: Update the first object recognition model in such a way that the value of the loss optimization function is minimized.

After the value of the feature recognition loss function and the value of the tracking loss function of the first object recognition model are determined through steps S406 to S407, the two values are substituted into equation (4) for calculation, to obtain the value of the loss optimization function, and the first object recognition model is updated in such a way that the value of the loss optimization function is minimized. In other words, the value of the loss optimization function is constantly reduced. Since the value of the feature recognition loss function and the value of the tracking loss function may be deduced according to the value of the loss optimization function, a model parameter of the first object recognition model is adjusted in such a way that the distance between the first reference response and the second reference response and the distance between the first test response and the second test response satisfy the value of the feature recognition loss function, and the model parameter of the first object recognition model is adjusted such a way that the Euclidean distance between the tracking response and the tracking label satisfy the value of the tracking loss function.

By repeating steps S401 to S408, a first object recognition model that not only has a desirable feature recognition function but also enables the extracted features to be more applicable to the visual object tracking scenario can be obtained. Proved by practice, the first object recognition model obtained by using the method for training a model provided in this embodiment of this application and by combining model compression and knowledge transfer on the second object recognition model has a volume that is only one tens of the second object recognition model. In addition, the first object recognition model has similar feature extraction performance to the second object recognition model and desirable tracking performance, and achieves real-time visual tracking.

Since the template image and the test image used during updating of the first object recognition model in steps S401 to S408 both include the tracked object, it can be ensured that the updated first object recognition model can have a desirable capability to extract features of the tracked object. However, in practical applications, the image for which the first object recognition model is invoked for recognition may include other backgrounds in addition to the tracked object. Therefore, in order to further improve the capability of the first object recognition model, in this embodiment of the application, after the first object recognition model is updated through steps S401 to S408, the first object recognition model is further updated by using a positive sample and a negative sample, so that the first object recognition model has a more desirable feature recognition capability, that is, can more desirably distinguish between the tracked object and the background included in the image.

Specifically, updating the first object recognition model by using the positive sample and the negative sample may include: acquiring a reference image including the tracked object, and determining, based on the reference image, a positive sample and a negative sample for the training, the reference image being a first frame of image in a video sequence to be tracked by using the first object recognition model, the positive sample being an image including the tracked object, the negative sample being an image not including the tracked object, the positive sample including a positive sample tracking label of the tracked object, and the negative sample including a negative sample tracking label of the tracked object; invoking the updated first object recognition model to recognize the positive sample to obtain a positive sample recognition response, and invoking the updated first object recognition model to recognize the negative sample to obtain a negative sample recognition response; tracking the positive sample recognition response to obtain a positive sample tracking response in the positive sample to the tracked object, and tracking the negative sample recognition response to obtain a negative sample tracking response in the negative sample to the tracked object; and training the updated first object recognition model based on difference information between the positive sample tracking response and the positive sample tracking label and difference information between the negative sample tracking response and the negative sample tracking label.

Figure 7:
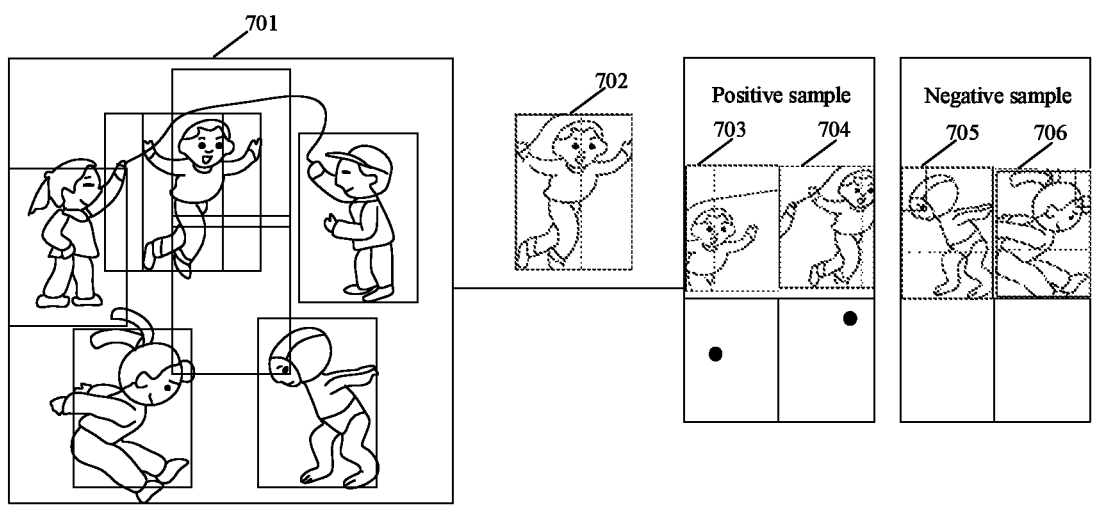
FIG. 7 is a schematic diagram of acquiring a positive sample and a negative sample according to an embodiment of this application.

In an embodiment of this application, the positive sample and the negative sample may be obtained based on the reference image in the following manner: randomly trimming the reference image to obtain a plurality of image blocks, an image block including the tracked object being used as the positive sample, and an image block not including the tracked object being used as the negative sample. The positive sample tracking label corresponding to the positive sample is a real position of the tracked object in the positive sample. Since the negative sample does not include the tracked object, the negative sample tracking label corresponding to the negative sample is 0. For example, FIG. 7 is a schematic diagram of acquiring the positive sample and the negative sample. In FIG. 7, 701 is a reference image. The reference image is randomly trimmed to obtain a plurality of image blocks, such as a plurality of marking boxes included in 701. Each of the marking boxes represents an image block. It is assumed that the tracked object is 702. Image blocks including 702, such as 703 and 704 in the figure are selected from a plurality of image blocks of 701 as the positive sample, and image blocks not including 702, such as 705 and 706 in the figure are used as the negative sample. Positive sample tracking labels corresponding to 703 and 704 are real positions of the tracked object in 703 and 704, as shown by dots below 703 and 704 in the figure. Since the negative samples 705 and 706 do not include the tracked objects, tracking labels corresponding to the negative samples are 0, and no dots appear.

In an embodiment, the training the updated first object recognition model based on difference information between the positive sample tracking response and the positive sample tracking label and difference information between the negative sample tracking response and the negative sample tracking label includes: acquiring a tracking loss optimization function; determining a value of the tracking loss optimization function based on the difference information between the positive sample tracking response and the positive sample tracking label and the difference information between the negative sample tracking response and the negative sample tracking label; and training the updated first object recognition model in such a way that the value of the tracking loss optimization function is minimized.

The difference information between the positive sample tracking response and the positive sample tracking label includes a Euclidean distance between a position of the tracked object that is obtained by the first object recognition model by tracking the positive sample and a real position of the tracked object in the positive sample. Similarly, the difference information between the negative sample tracking response and the negative sample tracking label includes a Euclidean distance between the position of the tracked object that is obtained by the first object recognition model by tracking the negative sample and a real position of the tracked object in the negative sample. The two distances are substituted into the tracking loss optimization function to obtain the value of the tracking loss optimization function, and then the updated first object recognition model is updated again in such a way that the value of the tracking loss optimization function is minimized. The steps of the tracking loss optimization are repeated to complete the update of the updated first object recognition model.

In an embodiment, based on the description of the multi-scale tracking optimization in step S407, during updating of the updated first object recognition model based on difference information between the positive sample tracking response and the positive sample tracking label and difference information between the negative sample tracking response and the negative sample tracking label, multi-scale optimization may also be adopted.

It may be learned from the above that the first object recognition model includes a first convolutional layer, a second convolutional layer, and a third convolutional layer, and the positive sample tracking label includes a first positive sample tracking label corresponding to the first convolutional layer, a second positive sample tracking label corresponding to the second convolutional layer, and a third positive sample tracking label corresponding to the third convolutional layer. The positive sample recognition response is obtained by fusing a first positive sample recognition sub-response corresponding to the first convolutional layer, a second positive sample recognition sub-response corresponding to the second convolutional layer, and a third positive sample recognition sub-response corresponding to the third convolutional layer. The negative sample recognition response is obtained by fusing a first negative sample recognition sub-response corresponding to the first convolutional layer, a second negative sample recognition sub-response corresponding to the second convolutional layer, and a third negative sample recognition sub-response corresponding to the third convolutional layer.

The positive sample tracking response may include a first positive sample tracking response obtained by tracking the first positive sample recognition sub-response by using the tracking training algorithm, a second positive sample tracking response obtained by tracking the second positive sample recognition sub-response by using the tracking training algorithm, and a third positive sample tracking response obtained by tracking the third positive sample recognition sub-response by using the tracking training algorithm. The negative sample tracking response may include a first negative sample tracking response obtained by tracking the first negative sample recognition sub-response by using the tracking training algorithm, a second negative sample tracking response obtained by tracking the second negative sample recognition sub-response by using the tracking training algorithm, and a third negative sample tracking response obtained by tracking the third negative sample recognition sub-response by using the tracking training algorithm.

An implementation of the multi-scale tracking loss optimization may be: determining a value of a tracking loss optimization function of the first convolutional layer based on difference information between the first positive sample tracking response and a first positive sample tracking label and difference information between the first negative sample tracking response and a first negative sample tracking label; determining a value of a tracking loss optimization function of the second convolutional layer based on difference information between a second positive sample tracking response and a second positive sample tracking label and difference information between a second negative sample tracking response and a second negative sample tracking label; determining a value of a tracking loss optimization function of the third convolutional layer based on difference information between a third positive sample tracking response and a third positive sample tracking label and difference information between a third negative sample tracking response and a third negative sample tracking label; and finally determining the value of the tracking loss optimization function according to the value of the tracking loss optimization function of the first convolutional layer, the value of the tracking loss optimization function of the second convolutional layer, and the value of the tracking loss optimization function of the third convolutional layer. It is assumed that the tracking loss optimization function for the multi-scale tracking loss optimization may be expressed as the following equation (10):

$$\mathcal{L}_{tracking} = \sum_l (\|r_l^+ - g_l\|^2 + \|r_l^-\|^2), \text{ where} \quad (10)$$

$$r_l^+ = \mathcal{F}^{-1}(\hat{w}_l^* \odot \hat{\varphi}_l(z^+)), \text{ and } r_l^- = \mathcal{F}^{-1}(\hat{w}_l^* \odot \hat{\varphi}_l(z^-)). \quad (11)$$

$r_l^+$ represents an $l^{th}$ positive sample tracking response obtained by tracking an $l^{th}$ positive sample recognition sub-response corresponding to the $l^{th}$ convolutional layer by using the tracking training algorithm, $g_l$ represents a positive sample tracking label corresponding to a positive sample in the $l^{th}$ convolutional layer, $r_l^-$ represents an $l^{th}$ negative sample tracking response obtained by tracking an $l^{th}$ negative sample recognition sub-response corresponding to the $l^{th}$ convolutional layer by using the tracking training algorithm, and $w_l$ represents a tracking algorithm parameter corresponding to the $l^{th}$ convolutional layer.

It may be learned from the above that tracking algorithm parameters corresponding to different convolutional layers are obtained by training the second object recognition model and corresponding positive samples in the corresponding convolutional layers. The corresponding positive samples in the different convolutional layers are images having the same size but different resolutions. For a specific training process, refer to steps S11 to S13, and details are not described herein again.

After the first object recognition model is updated again by using the reference image, the first object recognition model may be combined with some tracking algorithms to be applied to scenarios that require visual object tracking, such scenario analysis, monitoring devices, human-machine interaction, and the like. Specifically, an implementation of combining the first object recognition model with some tracking algorithms to be applied to the visual object tracking scenario may include: acquiring a to-be-processed image, and determining, according to the marking information of the tracked object in the reference image, a predicted tracked object included in the to-be-processed image, the to-be-processed image being an image, other than the first frame, in the video sequence on which visual object tracking is to be performed by using the first object recognition model; invoking the updated first object recognition model to recognize the tracked object in the reference image to obtain a first recognition feature; invoking the updated first object recognition model to recognize the predicted tracked object in the to-be-processed image to obtain a second recognition feature; and determining, based on the first recognition feature and the second recognition feature, a target feature for tracking, and tracking the target feature by using a tracking algorithm to obtain position information of the tracked object in the to-be-processed image. For specific application of this part, refer to the corresponding description of FIG. 1, and details are not described herein again.

In this embodiment of this application, during training of the lightweight first object recognition model by using the heavyweight second object recognition model, the first object recognition model and the second object recognition model are respectively invoked to recognize the feature of the tracked object in the template image for training to obtain the first reference response and the second reference response, and then the first object recognition model and the second object recognition model are respectively invoked to recognize the feature of the tracked object in the test image for training to obtain the first test response and the second test response. Then the first test response is tracked to obtain the tracking response. Finally, a feature extraction performance loss of the first object recognition model compared to the second object recognition model is determined according to the difference information between the first reference response and the second reference response and the difference information between the first test response and the second test response, and a tracking performance loss of the first object recognition model is determined according to the difference information between the tracking label and the tracking response, so as to perform loss optimization on the first object recognition model according to the feature extraction performance loss and the tracking performance loss, so that the updated lightweight first object recognition model has the same or similar feature extraction performance as the second object recognition model and a faster feature extraction speed, and it is ensured that the features extracted by the first object recognition model are more applicable to the visual object tracking scenario, thereby improving the accuracy and real-time performance of the visual object tracking.

Figure 8:
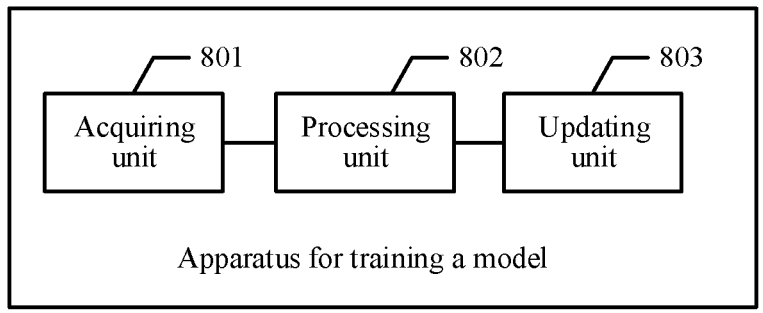
FIG. 8 is a schematic structural diagram of an apparatus for training a model according to an embodiment of this application.

Based on the description of the embodiment of the above method for training a model, an embodiment of this application further discloses an apparatus for training a model, which can perform the methods shown in FIG. 2 and FIG. 4. Referring to FIG. 8, the apparatus for training a model may operate the following units:

an acquiring unit 801 configured to acquire a template image and a test image for the training, the template image and the test image each including a tracked object, the test image including a tracking label of the tracked object, the tracking label being used for indicating a marking position of the tracked object in the test image;

a processing unit 802 configured to: invoke a first object recognition model to recognize a feature of the tracked object in the template image to obtain a first reference response, and invoke a second object recognition model to recognize the feature of the tracked object in the template image to obtain a second reference response, invoke the first object recognition model to recognize a feature of the tracked object in the test image to obtain a first test response, and invoke the second object recognition model to recognize the feature of the tracked object in the test image to obtain a second test response, and track the first test response to obtain a tracking response of the tracked object, the tracking response being used for indicating a tracking position of the tracked object in the test image; and an updating unit 803 configured to update the first object recognition model based on difference information between the first reference response and the second reference response, difference information between the first test response and the second test response, and difference information between the tracking label and the tracking response.

In an embodiment, the acquiring unit 801 is further configured to: acquire the second object recognition model. The processing unit 802 is further configured to: trim the second object recognition model to obtain the first object recognition model.

In an embodiment, the updating unit 803 is configured to perform the following operations during updating of the first object recognition model based on the difference information between the first reference response and the second reference response, the difference information between the first test response and the second test response, and the difference information between the tracking label and the tracking response: acquiring a loss optimization function corresponding to the first object recognition model; determining a value of the loss optimization function based on the difference information between the first reference response and the second reference response, the difference information between the first test response and the second test response, and the difference information between the tracking label and the tracking response; and updating the first object recognition model in such a way that the value of the loss optimization function is minimized.

In an embodiment, the loss optimization function includes a feature recognition loss function and a tracking loss function, and the updating unit 803 is configured to perform the following operations during determining of the value of the loss optimization function based on the difference information between the first reference response and the second reference response, the difference information between the first test response and the second test response, and the difference information between the tracking label and the tracking response: acquiring the feature recognition loss function, and determining a value of the feature recognition loss function based on the difference information between the first reference response and the second reference response and the difference information between the first test response and the second test response; acquiring the tracking loss function, and determining a value of the tracking loss function based on the difference information between the tracking label and the tracking response; and determining the value of the loss optimization function based on the value of the feature recognition loss function and the value of the tracking loss function.

In an embodiment, the first object recognition model includes a first convolutional layer, a second convolutional layer, and a third convolutional layer, the first test response being obtained by fusing a first test sub-response corresponding to the first convolutional layer, a second test sub-response corresponding to the second convolutional layer, and a third test sub-response corresponding to the third convolutional layer. The updating unit 803 is configured to perform the following operations during determining of the value of the tracking loss function based on the difference information between the tracking label and the tracking response:

determining a tracking loss value of the first convolutional layer based on difference information between a first tracking label corresponding to the first convolutional layer and a first tracking response obtained by tracking the first test sub-response; determining a tracking loss value of the second convolutional layer based on difference information between a second tracking label corresponding to the second convolutional layer and a second tracking response obtained by tracking the second test sub-response; determining a tracking loss value of the third convolutional layer based on difference information between a third tracking label corresponding to the third convolutional layer and a third tracking response obtained by tracking the third test sub-response; and fusing the tracking loss value corresponding to the first convolutional layer, the tracking loss value corresponding to the second convolutional layer, and the tracking loss value corresponding to the third convolutional layer to obtain the value of the tracking loss function. The first tracking response, the second tracking response, and the third tracking response have different resolutions.

In an embodiment, the first object recognition model includes a plurality of convolutional layers connected in a connection order, the first convolutional layer being a first one of the convolutional layers that is indicated by the connection order, the third convolutional layer being a last one of the convolutional layers that is indicated by the connection order, and the second convolutional layer being any of the convolutional layers other than the first one of the convolutional layers and the last one of the convolutional layers.

In an embodiment, the acquiring unit 801 is further configured to acquire a reference image including the tracked object, and determining, based on the reference image, a positive sample and a negative sample for the training, the positive sample being an image including the tracked object, the negative sample being an image not including the tracked object, the positive sample including a positive sample tracking label of the tracked object, the negative sample including a negative sample tracking label of the tracked object, and the reference image including marking information of the tracked object.

The processing unit 802 is further configured to invoke the updated first object recognition model to recognize the positive sample to obtain a positive sample recognition response, and invoke the updated first object recognition model to recognize the negative sample to obtain a negative sample recognition response.

The processing unit 802 is further configured to track the positive sample recognition response to obtain a positive sample tracking response in the positive sample to the tracked object, and track the negative sample recognition response to obtain a negative sample tracking response in the negative sample to the tracked object.

The updating unit 803 is further configured to train the updated first object recognition model based on difference information between the positive sample tracking response and the positive sample tracking label and difference information between the negative sample tracking response and the negative sample tracking label.

In an embodiment, the updating unit 803 is configured to perform the following steps during training of the updated first object recognition model based on the difference information between the positive sample tracking response and the positive sample tracking label and the difference information between the negative sample tracking response and the negative sample tracking label:

acquiring a tracking loss optimization function; determining a value of the tracking loss optimization function based on the difference information between the positive sample tracking response and the positive sample tracking label and the difference information between the negative sample tracking response and the negative sample tracking label; and updating the updated first object recognition model in such a way that the value of the tracking loss optimization function is minimized.

In an embodiment, the acquiring unit 801 is further configured to acquire a to-be-processed image. The processing unit 802 is further configured to determine, according to the marking information of the tracked object in the reference image, a predicted tracked object included in the to-be-processed image. The processing unit 802 is further configured to invoke the updated first object recognition model to recognize the tracked object in the reference image to obtain a first recognition feature. The processing unit 803 is further configured to invoke the updated first object recognition model to recognize the predicted tracked object in the to-be-processed image to obtain a second recognition feature. The processing unit 802 is further configured to determine, based on the first recognition feature and the second recognition feature, a target feature for tracking, and track the target feature by using a tracking algorithm to obtain position information of the tracked object in the to-be-processed image.

According to an embodiment of this application, the steps in the method shown in FIG. 2 or FIG. 4 may be performed by the units of the apparatus for training a model shown in FIG. 8. For example, step S201 shown in FIG. 2 may be performed by the acquiring unit 801 shown in FIG. 8, steps S202 to S204 may be performed by the processing unit 802 shown in FIG. 8, and step S205 may be performed by the updating unit 803 shown in FIG. 8. For another example, steps S401, S402, and S406 shown in FIG. 4 may be performed by the acquiring unit 801 shown in FIG. 8, steps S403 to S405 and S407 may be performed by the processing unit 802 in FIG. 8, and step S408 may be performed by the updating unit 803 shown in FIG. 8.

According to another embodiment of this application, the units of the apparatus for training a model shown in FIG. 8 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the apparatus for training a model may also include other units. In an actual application, the functions may also be cooperatively implemented by other units and may be cooperatively implemented by a plurality of units. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

According to another embodiment of this application, a computer program (including program code) that can perform the steps in the corresponding method shown in FIG. 2 or FIG. 4 may be run on a general computing device, such as a computer, which includes processing elements and storage elements such as a central processing unit (CPU), a random access memory (RAM), and a read-only memory (ROM), to construct the apparatus for training a model shown in FIG. 8 and implement the method for training a model in the embodiments of this application. The computer program may be recorded on, for example, a computer-readable recording medium, and may be loaded into the foregoing computing device by using the computer-readable recording medium and run on the computing device.

In this embodiment of this application, during training of the first object recognition model by using the second object recognition model, the first object recognition model and the second object recognition model are first respectively invoked to recognize the feature of the tracked object in the template image to obtain the first reference response and the second reference response, and then the first object recognition model and the second object recognition model are respectively invoked to recognize the feature of the tracked object in the test image to obtain the first test response and the second test response. Further, the first test response is tracked to obtain a tracking response of the tracked object. Therefore, a feature extraction performance loss of the first object recognition model compared to the second object recognition model may be determined according to the difference information between the first reference response and the second reference response and the difference information between the first test response and the second test response, and a tracking performance loss of the first object recognition model may be determined according to the difference information between the tracking label and the tracking response. The first object recognition model is updated based on the feature extraction performance loss of the first object recognition model and the tracking performance loss, so that the updated first object recognition model has the same or relatively similar feature extraction performance as the second object recognition model, and the extracted features are more applicable to the visual object tracking scenario, thereby improving the accuracy of the visual object tracking.

Figure 9:
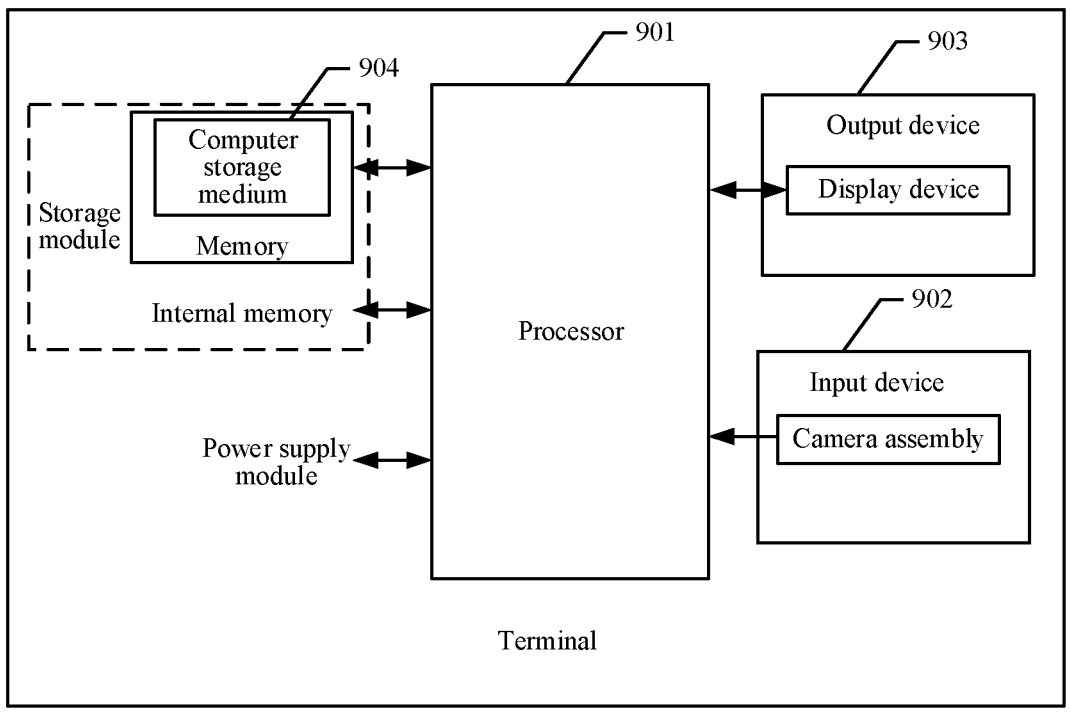
FIG. 9 is a schematic structural diagram of a terminal according to an embodiment of this application.

Based on the descriptions of the foregoing method embodiments and apparatus embodiments, an embodiment of this application further provides a computer device, such as a terminal shown in FIG. 9. Referring to FIG. 9, the terminal at least includes a processor 901, an input device 902, an output device 903, and a computer storage medium 904. The input device 902 may further include a camera assembly, which may be configured to obtain a template image and/or a test image. The camera assembly may be further configured acquire a reference image and/or a to-be-processed image. The camera assembly may be an assembly configured on a terminal when the terminal leaves the factory or an external assembly connected to the terminal. In an embodiment of this application, the terminal may be further connected to other devices to receive template images and/or test images transmitted by other devices or to receive reference images and/or to-be-processed images transmitted by other devices.

The computer storage medium 904 may be stored in a memory of the terminal. The computer storage medium 904 is configured to store a computer program. The computer program includes program instructions. The processor 901 is configured to execute the program instructions stored in the computer storage medium 904. The processor 901 (or referred to as a central processing unit, CPU) is a computing core and control core of the terminal, which is adapted to implement one or more instructions, and specifically, adapted to load and execute one or more instructions to implement corresponding method processes or corresponding functions. In an embodiment, the processor 901 in this embodiment of this application may be configured to: acquire a template image and a test image for the training, the template image and the test image each including a tracked object, the test image including a tracking label of the tracked object, the tracking label being used for indicating a marking position of the tracked object in the test image; invoke a first object recognition model to recognize a feature of the tracked object in the template image to obtain a first reference response, and invoke a second object recognition model to recognize the feature of the tracked object in the template image to obtain a second reference response; invoke the first object recognition model to recognize a feature of the tracked object in the test image to obtain a first test response, and invoke the second object recognition model to recognize the feature of the tracked object in the test image to obtain a second test response; track the first test response to obtain a tracking response of the tracked object, the tracking response being used for indicating a tracking position of the tracked object in the test image; and update the first object recognition model based on difference information between the first reference response and the second reference response, difference information between the first test response and the second test response, and difference information between the tracking label and the tracking response.

An embodiment of this application further provides a computer storage medium. The computer storage medium is a memory device in a terminal and is configured to store programs and data. As can be understood, the computer storage medium herein may include an internal storage medium of the terminal and may further include an extended storage medium supported by the terminal. The computer storage medium provides storage space, and the storage space stores an operating system of the terminal. In addition, the storage space further stores one or more instructions suitable to be loaded and executed by the processor 901. The instructions may be one or more computer programs (including program code). The computer storage medium herein may be a high-speed RAM or a non-volatile memory, for example, at least one magnetic disk memory. In an embodiment of this application, the computer storage medium may be at least one computer storage medium located away from the foregoing processor.

In an embodiment, one or more instructions stored in the computer storage medium may be loaded and executed by the processor 901 to implement corresponding steps of the method in the foregoing embodiments related to model training. In a specific implementation, the one or more instructions in the computer storage medium are loaded by the processor 901 to perform the following steps:

acquiring a template image and a test image for the training, the template image and the test image each including a tracked object, the test image including a tracking label of the tracked object, the tracking label being used for indicating a marking position of the tracked object in the test image; invoking a first object recognition model to recognize a feature of the tracked object in the template image to obtain a first reference response, and invoking a second object recognition model to recognize the feature of the tracked object in the template image to obtain a second reference response; invoking the first object recognition model to recognize a feature of the tracked object in the test image to obtain a first test response, and invoking the second object recognition model to recognize the feature of the tracked object in the test image to obtain a second test response; tracking the first test response to obtain a tracking response of the tracked object, the tracking response being used for indicating a tracking position of the tracked object in the test image; and updating the first object recognition model based on difference information between the first reference response and the second reference response, difference information between the first test response and the second test response, and difference information between the tracking label and the tracking response.

In an embodiment, the one or more instructions in the computer storage medium are loaded by the processor 901 to further perform the following steps: acquiring the second object recognition model; and trimming the second object recognition model to obtain the first object recognition model.

In an embodiment, the processor 901 is configured to perform the following operations during updating of the first object recognition model based on the difference information between the first reference response and the second reference response, the difference information between the first test response and the second test response, and the difference information between the tracking label and the tracking response:

acquiring a loss optimization function corresponding to the first object recognition model; determining a value of the loss optimization function based on the difference information between the first reference response and the second reference response, the difference information between the first test response and the second test response, and the difference information between the tracking label and the tracking response; and updating the first object recognition model in such a way that the value of the loss optimization function is minimized.

In an embodiment, the loss optimization function includes a feature recognition loss function and a tracking loss function, and the processor 901 is configured to perform the following operations during determining of the value of the loss optimization function based on the difference information between the first reference response and the second reference response, the difference information between the first test response and the second test response, and the difference information between the tracking label and the tracking response:

acquiring the feature recognition loss function, and determining a value of the feature recognition loss function based on the difference information between the first reference response and the second reference response and the difference information between the first test response and the second test response; acquiring the tracking loss function, and determining a value of the tracking loss function based on the difference information between the tracking label and the tracking response; and determining the value of the loss optimization function based on the value of the feature recognition loss function and the value of the tracking loss function.

In an embodiment, the first object recognition model includes a first convolutional layer, a second convolutional layer, and a third convolutional layer, the first test response being obtained by fusing a first test sub-response corresponding to the first convolutional layer, a second test sub-response corresponding to the second convolutional layer, and a third test sub-response corresponding to the third convolutional layer. The processor 901 is configured to perform the following operations during determining of the value of the tracking loss function based on the difference information between the tracking label and the tracking response:

determining a tracking loss value of the first convolutional layer based on difference information between a first tracking label corresponding to the first convolutional layer and a first tracking response obtained by tracking the first test sub-response;

determining a tracking loss value of the second convolutional layer based on difference information between a second tracking label corresponding to the second convolutional layer and a second tracking response obtained by tracking the second test sub-response; determining a tracking loss value of the third convolutional layer based on difference information between a third tracking label corresponding to the third convolutional layer and a third tracking response obtained by tracking the third test sub-response; and fusing the tracking loss value corresponding to the first convolutional layer, the tracking loss value corresponding to the second convolutional layer, and the tracking loss value corresponding to the third convolutional layer to obtain the value of the tracking loss function. The first tracking response, the second tracking response, and the third tracking response have different resolutions.

In an embodiment, the first object recognition model includes a plurality of convolutional layers connected in a connection order, the first convolutional layer being a first one of the convolutional layers that is indicated by the connection order, the third convolutional layer being a last one of the convolutional layers that is indicated by the connection order, and the second convolutional layer being any of the convolutional layers other than the first one of the convolutional layers and the last one of the convolutional layers.

In an embodiment, the one or more instructions in the computer storage medium are loaded by the processor 901 to further perform the following steps:

acquiring a reference image including the tracked object, and determining, based on the reference image, a positive sample and a negative sample for the training, the positive sample being an image including the tracked object, the negative sample being an image not including the tracked object, the positive sample including a positive sample tracking label of the tracked object, the negative sample including a negative sample tracking label of the tracked object, and the reference image including marking information of the tracked object; invoking the updated first object recognition model to recognize the positive sample to obtain a positive sample recognition response, and invoking the updated first object recognition model to recognize the negative sample to obtain a negative sample recognition response; tracking the positive sample recognition response to obtain a positive sample tracking response in the positive sample to the tracked object, and tracking the negative sample recognition response to obtain a negative sample tracking response in the negative sample to the tracked object; training the updated first object recognition model based on difference information between the positive sample tracking response and the positive sample tracking label and difference information between the negative sample tracking response and the negative sample tracking label.

In an embodiment, the processor 901 is configured to perform the following steps during updating of the updated first object recognition model based on the difference information between the positive sample tracking response and the positive sample tracking label and the difference information between the negative sample tracking response and the negative sample tracking label:

acquiring a tracking loss optimization function; determining a value of the tracking loss optimization function based on the difference information between the positive sample tracking response and the positive sample tracking label and the difference information between the negative sample tracking response and the negative sample tracking label; and updating the updated first object recognition model in such a way that the value of the tracking loss optimization function is minimized.

In an embodiment, the one or more instructions in the computer storage medium are loaded by the processor 901 to further perform the following steps:

acquiring a to-be-processed image, and determining, according to the marking information of the tracked object in the reference image, a predicted tracked object included in the to-be-processed image; invoking the updated first object recognition model to recognize the tracked object in the reference image to obtain a first recognition feature; invoking the updated first object recognition model to recognize the predicted tracked object in the to-be-processed image to obtain a second recognition feature; and determining, based on the first recognition feature and the second recognition feature, a target feature for tracking, and tracking the target feature by using a tracking algorithm to obtain position information of the tracked object in the to-be-processed image.

The foregoing disclosure is merely embodiments of this application, and certainly is not intended to limit the protection scope of this application. Therefore, equivalent variations made in accordance with the claims of this application shall fall within the scope of this application.

What is claimed is:

1. A method for training a model performed by a computing device, the method comprising:
acquiring a template image and a test image for the training, the template image and the test image each comprising a tracked object, the test image comprising a tracking label of the tracked object, the tracking label being used for indicating a marking position of the tracked object in the test image;

invoking a first object recognition model to recognize a feature of the tracked object in the template image to obtain a first reference response, and invoking a second object recognition model to recognize the feature of the tracked object in the template image to obtain a second reference response;

invoking the first object recognition model to recognize a feature of the tracked object in the test image to obtain a first test response, and invoking the second object recognition model to recognize the feature of the tracked object in the test image to obtain a second test response;

tracking the first test response to obtain a tracking response of the tracked object, the tracking response being used for indicating a tracking position of the tracked object in the test image; and updating the first object recognition model based on difference information between the first reference response and the second reference response, difference information between the first test response and the second test response, and difference information between the tracking label and the tracking response.

2. The method according to claim 1, further comprising:
acquiring the second object recognition model; and
trimming the second object recognition model to obtain the first object recognition model.

3. The method according to the claim 1, wherein the updating the first object recognition model based on difference information between the first reference response and the second reference response, difference information between the first test response and the second test response, and difference information between the tracking label and the tracking response comprises:

acquiring a loss optimization function corresponding to the first object recognition model;

determining a value of the loss optimization function based on the difference information between the first reference response and the second reference response, the difference information between the first test response and the second test response, and the difference information between the tracking label and the tracking response; and updating the first object recognition model in such a way that the value of the loss optimization function is minimized.

4. The method according to the claim 3, wherein the loss optimization function comprises a feature recognition loss function and a tracking loss function, and the determining a value of the loss optimization function based on the difference information between the first reference response and the second reference response, the difference information between the first test response and the second test response, and the difference information between the tracking label and the tracking response comprises:

acquiring the feature recognition loss function, and determining a value of the feature recognition loss function based on the difference information between the first reference response and the second reference response and the difference information between the first test response and the second test response;

acquiring the tracking loss function, and determining a value of the tracking loss function based on the difference information between the tracking label and the tracking response; and determining the value of the loss optimization function based on the value of the feature recognition loss function and the value of the tracking loss function.

5. The method according to the claim 4, wherein the first object recognition model comprises a first convolutional layer, a second convolutional layer, and a third convolutional layer, the first test response being obtained by fusing a first test sub-response corresponding to the first convolutional layer, a second test sub-response corresponding to the second convolutional layer, and a third test sub-response corresponding to the third convolutional layer; and the determining a value of the tracking loss function based on the difference information between the tracking label and the tracking response comprises:

determining a tracking loss value of the first convolutional layer based on difference information between a first tracking label corresponding to the first convolutional layer and a first tracking response obtained by tracking the first test sub-response;

determining a tracking loss value of the second convolutional layer based on difference information between a second tracking label corresponding to the second convolutional layer and a second tracking response obtained by tracking the second test sub-response;

determining a tracking loss value of the third convolutional layer based on difference information between a third tracking label corresponding to the third convolutional layer and a third tracking response obtained by tracking the third test sub-response; and fusing the tracking loss value corresponding to the first convolutional layer, the tracking loss value corresponding to the second convolutional layer, and the tracking loss value corresponding to the third convolutional layer to obtain the value of the tracking loss function, wherein the first tracking response, the second tracking response, and the third tracking response have different resolutions.

6. The method according to claim 5, wherein the first object recognition model comprises a plurality of convolutional layers connected in a connection order, the first convolutional layer being a first one of the convolutional layers that is indicated by the connection order, the third convolutional layer being a last one of the convolutional layers that is indicated by the connection order, and the second convolutional layer being any of the convolutional layers other than the first one of the convolutional layers and the last one of the convolutional layers.

7. The method according to claim 1, further comprising:
acquiring a reference image comprising the tracked object, and determining, based on the reference image, a positive sample and a negative sample for the training, the positive sample being an image comprising the tracked object, the negative sample being an image not comprising the tracked object, the positive sample comprising a positive sample tracking label of the tracked object, the negative sample comprising a negative sample tracking label of the tracked object, and the reference image comprising marking information of the tracked object;

invoking the updated first object recognition model to recognize the positive sample to obtain a positive sample recognition response, and invoking the updated first object recognition model to recognize the negative sample to obtain a negative sample recognition response;

tracking the positive sample recognition response to obtain a positive sample tracking response in the positive sample to the tracked object, and tracking the negative sample recognition response to obtain a negative sample tracking response in the negative sample to the tracked object; and training the updated first object recognition model based on difference information between the positive sample tracking response and the positive sample tracking label and difference information between the negative sample tracking response and the negative sample tracking label.

8. The method according to claim 7, wherein the training the updated first object recognition model based on difference information between the positive sample tracking response and the positive sample tracking label and difference information between the negative sample tracking response and the negative sample tracking label comprises:

acquiring a tracking loss optimization function;

determining a value of the tracking loss optimization function based on the difference information between the positive sample tracking response and the positive sample tracking label and the difference information between the negative sample tracking response and the negative sample tracking label; and updating the updated first object recognition model in such a way that the value of the tracking loss optimization function is minimized.

9. The method according to claim 7, further comprising:

acquiring a to-be-processed image, and determining, according to the marking information of the tracked object in the reference image, a predicted tracked object comprised in the to-be-processed image;

invoking the updated first object recognition model to recognize the tracked object in the reference image to obtain a first recognition feature;

invoking the updated first object recognition model to recognize the predicted tracked object in the to-be-processed image to obtain a second recognition feature; and determining, based on the first recognition feature and the second recognition feature, a target feature for tracking, and tracking the target feature by using a tracking algorithm to obtain position information of the tracked object in the to-be-processed image.

10. A computing device, further comprising:

a processor configured to implement one or more instructions; and a computer-readable storage medium, storing one or more instructions, the one or more instructions being configured to be executed by the processor to perform a plurality of operations including:

acquiring a template image and a test image for the training, the template image and the test image each comprising a tracked object, the test image comprising a tracking label of the tracked object, the tracking label being used for indicating a marking position of the tracked object in the test image;

invoking a first object recognition model to recognize a feature of the tracked object in the template image to obtain a first reference response, and invoking a second object recognition model to recognize the feature of the tracked object in the template image to obtain a second reference response;

invoking the first object recognition model to recognize a feature of the tracked object in the test image to obtain a first test response, and invoking the second object recognition model to recognize the feature of the tracked object in the test image to obtain a second test response;

tracking the first test response to obtain a tracking response of the tracked object, the tracking response being used for indicating a tracking position of the tracked object in the test image; and updating the first object recognition model based on difference information between the first reference response and the second reference response, difference information between the first test response and the second test response, and difference information between the tracking label and the tracking response.

11. The computing device according to claim 10, wherein the plurality of operations further comprise:

acquiring the second object recognition model; and trimming the second object recognition model to obtain the first object recognition model.

12. The computing device according to claim 10, wherein the updating the first object recognition model based on difference information between the first reference response and the second reference response, difference information between the first test response and the second test response, and difference information between the tracking label and the tracking response comprises:

acquiring a loss optimization function corresponding to the first object recognition model;

determining a value of the loss optimization function based on the difference information between the first reference response and the second reference response, the difference information between the first test response and the second test response, and the difference information between the tracking label and the tracking response; and updating the first object recognition model in such a way that the value of the loss optimization function is minimized.

13. The computing device according to claim 12, wherein the loss optimization function comprises a feature recognition loss function and a tracking loss function, and the determining a value of the loss optimization function based on the difference information between the first reference response and the second reference response, the difference information between the first test response and the second test response, and the difference information between the tracking label and the tracking response comprises:

acquiring the feature recognition loss function, and determining a value of the feature recognition loss function based on the difference information between the first reference response and the second reference response and the difference information between the first test response and the second test response;

acquiring the tracking loss function, and determining a value of the tracking loss function based on the difference information between the tracking label and the tracking response; and determining the value of the loss optimization function based on the value of the feature recognition loss function and the value of the tracking loss function.

14. The computing device according to claim 13, wherein the first object recognition model comprises a first convolutional layer, a second convolutional layer, and a third convolutional layer, the first test response being obtained by fusing a first test sub-response corresponding to the first convolutional layer, a second test sub-response corresponding to the second convolutional layer, and a third test sub-response corresponding to the third convolutional layer;

and the determining a value of the tracking loss function based on the difference information between the tracking label and the tracking response comprises:

determining a tracking loss value of the first convolutional layer based on difference information between a first tracking label corresponding to the first convolutional layer and a first tracking response obtained by tracking the first test sub-response;

determining a tracking loss value of the second convolutional layer based on difference information between a second tracking label corresponding to the second convolutional layer and a second tracking response obtained by tracking the second test sub-response;

determining a tracking loss value of the third convolutional layer based on difference information between a third tracking label corresponding to the third convolutional layer and a third tracking response obtained by tracking the third test sub-response; and fusing the tracking loss value corresponding to the first convolutional layer, the tracking loss value corresponding to the second convolutional layer, and the tracking loss value corresponding to the third convolutional layer to obtain the value of the tracking loss function, wherein the first tracking response, the second tracking response, and the third tracking response have different resolutions.

15. The computing device according to claim 14, wherein the first object recognition model comprises a plurality of convolutional layers connected in a connection order, the first convolutional layer being a first one of the convolutional layers that is indicated by the connection order, the third convolutional layer being a last one of the convolutional layers that is indicated by the connection order, and the second convolutional layer being any of the convolutional layers other than the first one of the convolutional layers and the last one of the convolutional layers.

16. The computing device according to claim 10, wherein the plurality of operations further comprise:

acquiring a reference image comprising the tracked object, and determining, based on the reference image, a positive sample and a negative sample for the training, the positive sample being an image comprising the tracked object, the negative sample being an image not comprising the tracked object, the positive sample comprising a positive sample tracking label of the tracked object, the negative sample comprising a negative sample tracking label of the tracked object, and the reference image comprising marking information of the tracked object;

invoking the updated first object recognition model to recognize the positive sample to obtain a positive sample recognition response, and invoking the updated first object recognition model to recognize the negative sample to obtain a negative sample recognition response;

tracking the positive sample recognition response to obtain a positive sample tracking response in the positive sample to the tracked object, and tracking the negative sample recognition response to obtain a negative sample tracking response in the negative sample to the tracked object; and training the updated first object recognition model based on difference information between the positive sample tracking response and the positive sample tracking label and difference information between the negative sample tracking response and the negative sample tracking label.

17. The computing device according to claim 16, wherein the training the updated first object recognition model based on difference information between the positive sample tracking response and the positive sample tracking label and difference information between the negative sample tracking response and the negative sample tracking label comprises:

acquiring a tracking loss optimization function;

determining a value of the tracking loss optimization function based on the difference information between the positive sample tracking response and the positive sample tracking label and the difference information between the negative sample tracking response and the negative sample tracking label; and updating the updated first object recognition model in such a way that the value of the tracking loss optimization function is minimized.

18. The computing device according to claim 16, wherein the plurality of operations further comprise:

acquiring a to-be-processed image, and determining, according to the marking information of the tracked object in the reference image, a predicted tracked object comprised in the to-be-processed image;

invoking the updated first object recognition model to recognize the tracked object in the reference image to obtain a first recognition feature;

invoking the updated first object recognition model to recognize the predicted tracked object in the to-be-processed image to obtain a second recognition feature; and determining, based on the first recognition feature and the second recognition feature, a target feature for tracking, and tracking the target feature by using a tracking algorithm to obtain position information of the tracked object in the to-be-processed image.

19. A non-transitory computer-readable storage medium, storing computer program instructions, the computer program instructions, when executed by a processor of a computing device, causing the computing device to perform a plurality of operations including:

acquiring a template image and a test image for the training, the template image and the test image each comprising a tracked object, the test image comprising a tracking label of the tracked object, the tracking label being used for indicating a marking position of the tracked object in the test image;

invoking a first object recognition model to recognize a feature of the tracked object in the template image to obtain a first reference response, and invoking a second object recognition model to recognize the feature of the tracked object in the template image to obtain a second reference response;

invoking the first object recognition model to recognize a feature of the tracked object in the test image to obtain a first test response, and invoking the second object recognition model to recognize the feature of the tracked object in the test image to obtain a second test response;

tracking the first test response to obtain a tracking response of the tracked object, the tracking response being used for indicating a tracking position of the tracked object in the test image; and updating the first object recognition model based on difference information between the first reference response and the second reference response, difference information between the first test response and the second test response, and difference information between the tracking label and the tracking response.

20. The non-transitory computer-readable storage medium according to claim 19, wherein the updating the first object recognition model based on difference information between the first reference response and the second reference response, difference information between the first test response and the second test response, and difference information between the tracking label and the tracking response comprises:
- acquiring a loss optimization function corresponding to the first object recognition model;
- determining a value of the loss optimization function based on the difference information between the first reference response and the second reference response, the difference information between the first test response and the second test response, and the difference information between the tracking label and the tracking response; and
- updating the first object recognition model in such a way that the value of the loss optimization function is minimized.

\* \* \* \* \*